United States Patent
Urayama et al.

(10) Patent No.: US 12,537,809 B2
(45) Date of Patent: Jan. 27, 2026

(54) IN-VEHICLE RELAY DEVICE, IN-VEHICLE SYSTEM, INFORMATION PROCESSING METHOD, AND A PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hirofumi Urayama, Yokkaichi (JP); Darmawan Go, Yokkaichi (JP); Tomohiro Otsu, Yokkaichi (JP); Yoshitaka Kikuchi, Yokkaichi (JP); Takeshi Hagihara, Yokkaichi (JP); Hideki Maeda, Yokkaichi (JP); Tatsuya Izumi, Osaka (JP); Hideyuki Tanaka, Osaka (JP); Yusuke Yamamoto, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 198 days.

(21) Appl. No.: 18/553,455

(22) PCT Filed: Mar. 14, 2022

(86) PCT No.: PCT/JP2022/011363
§ 371 (c)(1),
(2) Date: Sep. 29, 2023

(87) PCT Pub. No.: WO2022/209822
PCT Pub. Date: Oct. 6, 2022

(65) Prior Publication Data
US 2024/0364674 A1   Oct. 31, 2024

(30) Foreign Application Priority Data
Mar. 31, 2021   (JP) .................................. 2021-060930

(51) Int. Cl.
H04L 9/40   (2022.01)
(52) U.S. Cl.
CPC .................................. *H04L 63/08* (2013.01)
(58) Field of Classification Search
CPC ... H04L 63/08; G06F 8/61; G06F 9/06; G06F 21/44
See application file for complete search history.

(56) References Cited

U.S. PATENT DOCUMENTS

2019/0232892 A1   8/2019   Moriya et al.
2020/0220838 A1   7/2020   Ogawa et al.
(Continued)

OTHER PUBLICATIONS

International Search Report, Application No. PCT/JP2022/209822, mailed May 31, 2022. ISA/Japan Patent Office.
(Continued)

*Primary Examiner* — El Hadji M Sall
(74) *Attorney, Agent, or Firm* — Honigman LLP

(57) ABSTRACT

An in-vehicle relay device to be connected to a plurality of in-vehicle devices mounted on a vehicle and an authentication device performing authentication of the in-vehicle device, to relay communication between the plurality of in-vehicle devices, the device including a control unit controlling the relay of the communication, in which the control unit relays authentication communication data for the authentication between the in-vehicle device and the authentication device before the authentication of the in-vehicle device connected to the in-vehicle relay device is completed, transmits and receives setting data for setting an in-vehicle network with the authentication device and the in-vehicle device, in parallel with the relay of the authentication (Continued)

communication data, acquires setting information of the in-vehicle network according to the transmitted setting data, from the authentication device, and starts relay based on the acquired setting information after the authentication is completed.

13 Claims, 7 Drawing Sheets

(56) References Cited

U.S. PATENT DOCUMENTS

2021/0194726 A1    6/2021   Itoda
2022/0231997 A1*   7/2022   Yamamoto .............. H04L 63/08

OTHER PUBLICATIONS

International Search Report, Application No. PCT/JP2022/011363, mailed May 31, 2022. ISA/Japan Patent Office.

* cited by examiner

FIG. 3

Destination information group

| Device names | Ethernet switch numbers | Physical port numbers | MAC addresses | IP addresses | Serial number |
|---|---|---|---|---|---|
| Second relay device | xxxxx | | | xxxxx | xxxxx |
| Sensor | xxxxx | xxxxx | xxxxx | xxxxx | xxxxx |
| Actuator | xxxxx | xxxxx | xxxxx | xxxxx | xxxxx |

IN-VEHICLE RELAY DEVICE, IN-VEHICLE SYSTEM, INFORMATION PROCESSING METHOD, AND A PROGRAM

CROSS-REFERENCE TO RELATED APPLICATIONS

This application is the U.S. national stage of PCT/JP2022/011363 filed on Mar. 14, 2022, which claims priority of Japanese Patent Application No. JP 2021-060930 filed on Mar. 31, 2021, the contents of which are incorporated herein.

TECHNICAL FIELD

The present disclosure relates to an in-vehicle relay device, an in-vehicle system, an information processing method, and a program.

BACKGROUND

An in-vehicle device including devices such as a power train system of engine control and a body system of air conditioner control, and a plurality of in-vehicle electronic control units (ECU) for controlling the devices, and a plurality of in-vehicle equipments including a relay device relaying communication between the in-vehicle devices are mounted on a vehicle. By connecting the plurality of in-vehicle equipments, an in-vehicle network including the in-vehicle equipment as a node is configured in the vehicle (for example, Japanese Patent Laid-Open Publication No. 2020-47992). The plurality of in-vehicle equipments perform communication through the in-vehicle network. The relay device of Japanese Patent Laid-Open Publication No. 2020-47992 performs authentication with respect to the connected in-vehicle device, and relays the communication of the in-vehicle device after the authentication is completed.

In the relay device of Japanese Patent Laid-Open Publication No. 2020-47992, starting early the communication through the in-vehicle network when the authentication with respect to the in-vehicle device is required is not considered.

The present disclosure has been made in consideration of such circumstances, and an object thereof is to provide an in-vehicle relay device and the like capable of starting early communication through an in-vehicle network when authentication with respect to an in-vehicle device is required.

SUMMARY

An in-vehicle relay device according to one aspect of the present disclosure is an in-vehicle relay device connected to a plurality of in-vehicle devices mounted on a vehicle and an authentication device performing authentication of the in-vehicle device to relay communication between the plurality of in-vehicle devices, the device including a control unit controlling the relay of the communication, in which the control unit relays authentication communication data for the authentication between the in-vehicle device and the authentication device before the authentication of the in-vehicle device connected to the in-vehicle relay device is completed, transmits and receives setting data for setting an in-vehicle network with respect to the in-vehicle device and the authentication device, in parallel with the relay of the authentication communication data, acquires setting information of the in-vehicle network according to the transmitted setting data from the authentication device, and starts relay based on the acquired setting information after the authentication is completed.

Effects of Present Disclosure

According to one aspect of the present disclosure, it is possible to start early the communication through the in-vehicle network when the authentication with respect to the in-vehicle device is required.

BRIEF DESCRIPTION OF DRAWINGS

FIG. 3 is a conceptual diagram illustrating a content example of a destination information group.

DETAILED DESCRIPTION OF PREFERRED EMBODIMENTS

Figure 1:
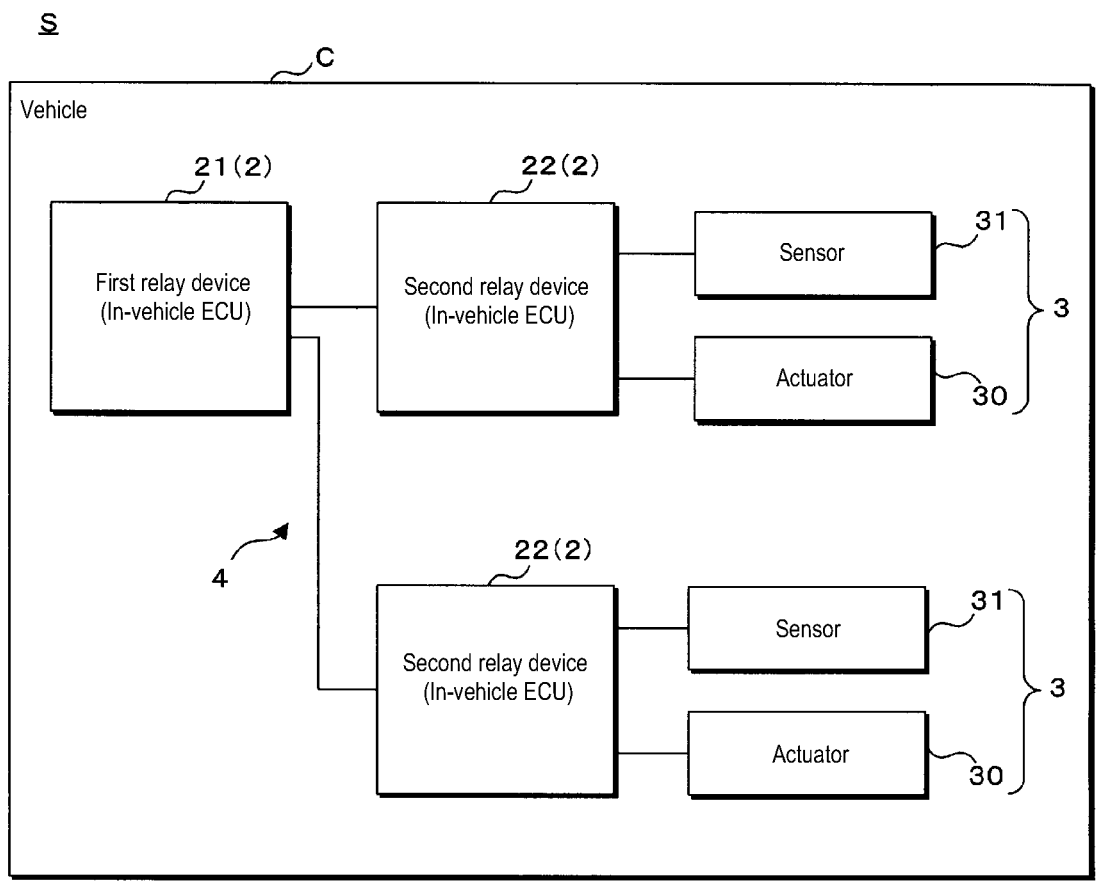
FIG. 1 is a schematic view illustrating a configuration of an in-vehicle system according to Embodiment 1.

First, an embodiment of the present disclosure will be described in detail. In addition, at least a part of the embodiment described below may be arbitrarily combined.

An in-vehicle relay device according to one aspect of the present disclosure is an in-vehicle relay device connected to a plurality of in-vehicle devices mounted on a vehicle and authentication device performing authentication of the in-vehicle device to relay communication between the plurality of in-vehicle devices, the device including a control unit controlling the relay of the communication, in which the control unit relays authentication communication data for the authentication between the in-vehicle device and the authentication device before the authentication of the in-vehicle device connected to the in-vehicle relay device is completed, transmits and receives setting data for setting an in-vehicle network with respect to the in-vehicle device and the authentication device, in parallel with the relay of the authentication communication data, acquires setting information of the in-vehicle network according to the transmitted setting data from the authentication device, and starts relay based on the acquired setting information after the authentication is completed.

In this aspect, the in-vehicle relay device is connected to the in-vehicle device and the authentication device. The in-vehicle relay device relays the communication between the in-vehicle devices. In addition, the in-vehicle relay device relays the communication between the in-vehicle device and the authentication device. The authentication device performs the authentication of the in-vehicle device. Before the authentication of the in-vehicle device is completed, the control unit of the in-vehicle relay device relays the authentication communication data. Further, the control unit transmits and receives the setting data with respect to the in-vehicle device and the authentication device, in parallel with the relay of the authentication communication data. In the relay of the authentication communication data, the control unit relays the authentication communication data to the authentication device from the in-vehicle device. In addition, the control unit relays the authentication communication data to the in-vehicle device from the authentication device. In other words, the control unit transmits and receives the authentication communication data with respect to the in-vehicle device and the authentication device. For example, in the transmission and reception of the setting data, the control unit receives the setting data transmitted from the in-vehicle device connected to the in-vehicle relay device. In addition, the control unit transmits the setting data to the authentication device. The control unit may relay the setting data transmitted from one of the in-vehicle device and the authentication device to the other of the in-vehicle device and the authentication device. In other words, the transmission and the reception of the authentication communication data may include the relay of the setting data. The authentication device acquires the setting data transmitted from the in-vehicle relay device, and transmits the setting information of the in-vehicle network according to the acquired setting data to the in-vehicle relay device. The control unit of the in-vehicle relay device acquires the setting information transmitted from the authentication device. After the authentication with respect to the in-vehicle device is completed, the control unit starts the relay based on the acquired setting information. In other words, the control unit applies the acquired setting information to the in-vehicle relay device (the own device). Accordingly, communication through the in-vehicle network based on the setting information is started. Before the authentication of the in-vehicle device is completed, the control unit of the in-vehicle relay device performs the relay of the authentication communication data and the transmission and reception of the setting data in parallel, and thus, it is possible to acquire the setting information from the authentication device earlier than a case where the setting data is transmitted to the authentication device after the authentication is completed. Accordingly, the in-vehicle relay device is capable of starting the communication through the in-vehicle network earlier than a case where the setting data is transmitted to the authentication device after the authentication is completed. Note that, the relay of the authentication communication data includes a plurality of sequences in which the control unit of the in-vehicle relay device transmits and receives the authentication communication data. Transmitting and receiving the setting data in parallel with the relay of the authentication communication data by the control unit indicates that a period in which the plurality of sequences are executed overlaps with a period in which the transmission and reception of the setting data is executed.

In the in-vehicle relay device according to one aspect of the present disclosure, the setting data includes at least one of destination information for performing communication and service resolution information for the in-vehicle device to start provision of a function, and the control unit outputs at least one of the acquired destination information of the in-vehicle device and service resolution information, and destination information of the in-vehicle relay device to the authentication device before the authentication is completed.

In this aspect, the control unit of the in-vehicle relay device acquires at least one of the destination information and the service resolution information of the in-vehicle device from the in-vehicle device connected to the in-vehicle relay device before the authentication of the in-vehicle device is completed. For example, the destination information includes an address such as an IP address and a MAC address. In addition, the destination information includes a port number of a connection port to which the in-vehicle device is connected, among connection ports provided in the in-vehicle relay device for the connection with the in-vehicle device. The service resolution information is information for the in-vehicle device to start the provision of the function (a service). For example, the service resolution information includes a device driver for controlling the in-vehicle device. The service resolution information is transmitted from the in-vehicle device. The control unit outputs at least one of the acquired destination information and service resolution information of the in-vehicle device, and the destination information of the in-vehicle relay device to the authentication device before the authentication of the in-vehicle device is completed. For example, the control unit outputs a destination information group including the destination information of the in-vehicle device and the destination information of the in-vehicle relay device, and the service resolution information acquired from the in-vehicle device to the authentication device. The service resolution information is relayed to the authentication device from the in-vehicle device by the in-vehicle relay device. It is possible to decrease a communication frequency between the authentication device and the in-vehicle relay device, compared to a case where the control unit individually outputs the destination information of the in-vehicle relay device and at least one of the destination information and the service resolution information of the in-vehicle device connected to the in-vehicle relay device to the authentication device.

In the in-vehicle relay device according to one aspect of the present disclosure, the in-vehicle device includes an existing in-vehicle device mounted in advance on the vehicle, and an additional in-vehicle device mounted on the vehicle at a time point after a time point when the existing in-vehicle device is mounted on the vehicle, and the authentication is performed with respect to the additional in-vehicle device.

In this aspect, the existing in-vehicle device is mounted on the vehicle. The existing in-vehicle device is connected to the in-vehicle relay device. When the additional in-vehicle device is mounted on the vehicle, the additional in-vehicle device is connected to the in-vehicle relay device. For example, when the additional in-vehicle device is connected to the in-vehicle relay device (the own device), the control unit of the in-vehicle relay device communicates with the authentication device, and allows the authentication device to perform the authentication of the additional in-vehicle device. Before the authentication of the in-vehicle device is completed, as described above, the control unit of the in-vehicle relay device relays the authentication communication data. In addition, the control unit of the in-vehicle relay device outputs setting data relevant to the additional in-vehicle device and the existing in-vehicle device, and setting data relevant to the in-vehicle relay device to the authentication device, in parallel with the relay of the authentication communication data. The control unit of the in-vehicle relay device acquires setting information of an in-vehicle network including the additional in-vehicle device as a node from the authentication device. When the additional in-vehicle device is mounted on the vehicle, it is possible to configure an in-vehicle network including the additional in-vehicle device as a node. When the additional in-vehicle device is connected to the in-vehicle relay device, the in-vehicle relay device, it is possible to start communication through the in-vehicle network including the additional in-vehicle device as a node earlier than a case where the setting data is output to the authentication device after the authentication is completed.

The in-vehicle relay device according to one aspect of the present disclosure is provided between the authentication device and the in-vehicle device.

In this aspect, the in-vehicle relay device is provided between the authentication device and the in-vehicle device, and thus, it is possible to configure the in-vehicle network forming a star-shaped network topology with the authentication device at the center. In addition, it is possible to configure the in-vehicle network forming a cascade-shaped network topology with the authentication device at the top.

An in-vehicle system according to one aspect of the present disclosure is an in-vehicle system, including: the authentication device and the in-vehicle relay device, in which the in-vehicle relay device outputs the setting data to the authentication device before the authentication of the in-vehicle device is completed, and the authentication device receives the setting data output from the in-vehicle relay device, and outputs the setting information according to the received setting data to the in-vehicle relay device.

In this aspect, the authentication device and the in-vehicle relay device are connected. For example, the plurality of in-vehicle devices are connected to the in-vehicle relay device. The in-vehicle relay device relays the communication between the plurality of in-vehicle devices. In addition, the in-vehicle relay device relays the communication between the in-vehicle device and the authentication device. The authentication device performs the authentication of the in-vehicle device. Before the authentication of the in-vehicle device is completed, the in-vehicle relay device outputs the setting data to the authentication device. The authentication device receives the setting data output from the in-vehicle relay device. The authentication device outputs the setting information according to the received setting data to the in-vehicle relay device. Specifically, the authentication device generates setting information of an in-vehicle network including the authentication device, the in-vehicle relay device, and the in-vehicle device as a node on the basis of the received setting data. The authentication device outputs the generated setting information to the in-vehicle relay device. The in-vehicle relay device acquires the output setting information. The authentication device and the in-vehicle relay device perform the relay of the communication through the in-vehicle network, on the basis of the generated setting information. After the authentication is completed, the authentication device is capable of generating the setting information earlier than a case where the in-vehicle relay device transmits the setting data to the authentication device. Accordingly, after the authentication is completed, the authentication device and the in-vehicle relay device are capable of starting the communication through the in-vehicle network earlier than a case where the setting data is transmitted to the authentication device.

An information processing method according to one aspect of the present disclosure is an information processing method performed by an in-vehicle relay device connected to a plurality of in-vehicle devices mounted on a vehicle and an authentication device performing authentication of the in-vehicle device to relay communication between the plurality of in-vehicle devices, the method including: relaying authentication communication data for the authentication between the in-vehicle device and the authentication device before the authentication of the in-vehicle device connected to the in-vehicle relay device is completed: transmitting and receiving setting data for setting an in-vehicle network with respect to the in-vehicle device and the authentication device, in parallel with the relay of the authentication communication data: acquiring setting information of the in-vehicle network according to the transmitted setting data from the authentication device; and starting relay based on the acquired setting information after the authentication is completed.

In this aspect, as with Aspect (1), it is possible to start the communication through the in-vehicle network earlier than a case where the setting data is transmitted to the authentication device after the authentication is completed.

A program according to one aspect of the present disclosure is a program for allowing a computer connected to a plurality of in-vehicle devices mounted on a vehicle and an authentication device performing authentication of the in-vehicle device to relay communication between the plurality of in-vehicle devices to execute processing of: relaying authentication communication data for the authentication between the in-vehicle device and the authentication device before the authentication of the in-vehicle device connected to the computer is completed: transmitting and receiving setting data for setting an in-vehicle network with respect to the in-vehicle device and the authentication device, in parallel with the relay of the authentication communication data: acquiring setting information of the in-vehicle network according to the transmitted setting data from the authentication device; and starting relay based on the acquired setting information after the authentication is completed.

In this aspect, it is possible to allow the computer to function as the in-vehicle relay device of one aspect of the present disclosure.

The present disclosure will be described in detail, on the basis of the drawings illustrating the embodiment thereof. An in-vehicle relay device according to the embodiment of the present disclosure will be described below with reference to the drawings. Note that, the present disclosure is not limited to the exemplification, but is indicated by the claims, and is intended to include all modifications within the meaning and the scope equivalent to the claims.

Embodiment 1

Hereinafter, an embodiment will be described on the basis of the drawings. FIG. 1 is a schematic view illustrating the configuration of an in-vehicle system S according to Embodiment 1. The in-vehicle system S includes a plurality of in-vehicle ECUs 2 mounted on a vehicle C. Among the plurality of in-vehicle ECUs 2, an in-vehicle device 3 is connected to at least a part of the in-vehicle ECUs 2. In FIG. 1, three in-vehicle ECUs 2 are mounted on the vehicle C, but the number of in-vehicle ECUs 2 mounted on the vehicle C is not limited to 3.

For example, the plurality of in-vehicle ECUs 2 may include an integrated in-vehicle ECU 2 (an integrated ECU) controlling the entire vehicle C, and an individual in-vehicle ECU 2 (an individual ECU) connected to the integrated in-vehicle ECU 2 such that communication is available connect and directly connected to the in-vehicle device 3. The integrated in-vehicle ECU 2 may be connected to an external server, which is not illustrated and connected to an external network such as the internet, such that communication is available, through an external communication device, which is not illustrated.

In FIG. 1, the integrated in-vehicle ECU 2 and a plurality of individual in-vehicle ECUs 2 are connected by an in-vehicle network 4 forming a star-shaped network topology such that communication is available. The integrated in-vehicle ECU 2 is provided at the center of the star-shaped network topology. The network topology may be a cascade-shaped network topology. For example, the integrated in-vehicle ECU 2 is provided at the top of the cascade-shaped network topology. The network topology in the in-vehicle system S is not limited to the examples described above. The in-vehicle system S may have a configuration in which the adjacent individual in-vehicle ECUs 2 are connected to each other to configure a loop-shaped network topology such that bidirectional communication is available and redundancy is attained.

The in-vehicle ECU 2 also functions as a relay device relaying communication, such as a gateway or an Ethernet switch. The relay device includes a first relay device 21 performing the authentication of the in-vehicle device 3 and relaying communication between a plurality of in-vehicle devices 3. In addition, the relay device includes a second relay device 22 connected to the in-vehicle device 3 and the first relay device 21 and relaying the communication between the plurality of in-vehicle devices 3. In this embodiment, the integrated in-vehicle ECU 2 functions as the first relay device 21. The first relay device 21 corresponds to an authentication device. The individual in-vehicle ECU 2 functions as the second relay device 22. The second relay device 22 corresponds to an in-vehicle relay device.

The individual in-vehicle ECU 2 is disposed in each area of the vehicle C and connected to the plurality of in-vehicle devices 3. The individual in-vehicle ECU 2 transmits and receives a signal or data with respect to the connected in-vehicle device 3. In addition, the individual in-vehicle ECU 2 communicates with the integrated in-vehicle ECU 2. The individual in-vehicle ECU 2 functions as the second relay device 22 as described above, and relays the communication between the plurality of in-vehicle devices 3 connected to the individual in-vehicle ECU 2, or the communication between the in-vehicle device 3 and another in-vehicle ECU 2 including the integrated in-vehicle ECU 2. The individual in-vehicle ECU 2 may also function as a power distribution device that distributes and relays power output from an electrical storage device, which is not illustrated, to supply to the in-vehicle device 3 connected to the own ECU, in addition to the relay of the communication.

The in-vehicle device 3, for example, includes an actuator 30 such as a door opening/closing device and a motor device, and various sensors 31 such as light detection and ranging (LiDAR), a light sensor, a CMOS camera, and an infrared sensor. The in-vehicle device 3 is not limited to the example described above, and may be a switch such as a door switch (SW) and a lamp SW, or may be a lamp. The in-vehicle device 3 includes an existing in-vehicle device 3 mounted in advance on the vehicle C, and an additional in-vehicle device 3 mounted on the vehicle C at a time point after a time point when the existing in-vehicle device 3 is mounted on the vehicle C. For example, the additional in-vehicle device 3 corresponds to Plug and Play. Note that, the time point when the existing in-vehicle device 3 is mounted on the vehicle C, for example, is a time point when the vehicle C is manufactured.

The integrated in-vehicle ECU 2, for example, is a central control unit such as a vehicle computer. The integrated in-vehicle ECU 2 generates and outputs a control signal to each of the in-vehicle devices 3, on the basis of the data from the in-vehicle device 3 relayed through another in-vehicle ECU 2 such as the individual in-vehicle ECU 2. The integrated in-vehicle ECU 2 generates a control signal for controlling the actuator 30 to be a target of the request signal, on the basis of information or data such as a request signal output from another in-vehicle ECU 2, and outputs the generated control signal to another in-vehicle ECU 2.

As described above, the integrated in-vehicle ECU 2 also functions as the first relay device 21. In FIG. 1, two in-vehicle ECUs 2 functioning as the second relay device 22 are connected to the first relay device 21. The first relay device 21 relays the communication between two second relay devices 22. In addition, the first relay device 21 relays the communication between the in-vehicle devices 3 connected to different second relay devices 22. Specifically, the first relay device 21 relays the communication between the in-vehicle device 3 connected to one second relay device 22 and the in-vehicle device 3 connected to the other second relay device 22. Note that, the number of second relay devices 22 connected to the first relay device 21 is not limited to 2. For example, three or more second relay devices 22 may be connected to the first relay device 21.

In this embodiment, the in-vehicle system S includes the integrated in-vehicle ECU 2 and the individual in-vehicle ECU 2, but the in-vehicle system S is not limited to the configuration including the integrated in-vehicle ECU 2 and the individual in-vehicle ECU 2. For example, the in-vehicle system S may include the plurality of in-vehicle ECUs 2 connected in peer-to-peer by a relay device such as a controller area network (CAN) gateway or an Ethernet switch, which is provided separately from the in-vehicle ECU 2.

Figure 2:
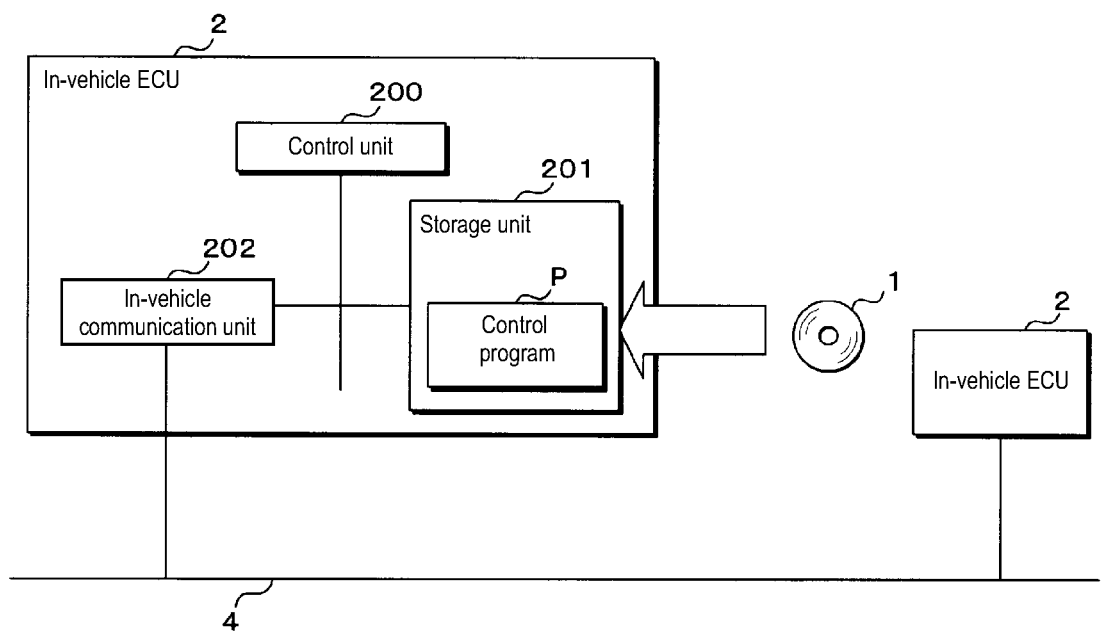
FIG. 2 is a block diagram illustrating a configuration of an in-vehicle ECU.

FIG. 2 is a block diagram illustrating the configuration of the in-vehicle ECU 2. The in-vehicle ECU 2 includes a control unit 200, a storage unit 201, and an in-vehicle communication unit 202. The control unit 200 includes an arithmetic processing device such as a central processing unit (CPU) or a micro processing unit (MPU), a combination of CPU or MPU and an Ethernet switch integrated circuit (IC) performing relay processing, an Ethernet switch IC having an arithmetic processing function, or the like. The control unit 200 reads out a control program P and data stored in advance in the storage unit 201 to execute, and thus, performs various control processing pieces, arithmetic processing pieces, and the like. For example, the control unit 200 includes a single CPU of a single core, a multi-CPU of a single core, a single CPU of a multi-core, and a multi-CPU of a multi-core. The control unit 200 is not limited to a software processing unit performing software processing, such as CPU, and may include a hardware processing unit performing various control processing pieces, arithmetic processing pieces, and the like by hardware processing, such as a field programmable gate array (FPGA), an application specific integrated circuit (ASIC), or a system on a chip (SoC).

The storage unit 201 includes a volatile memory element such as a random access memory (RAM), or a non-volatile memory element such as a read only memory (ROM), an electrically erasable programmable ROM (EEPROM), or a flash memory. The storage unit 201 may include a combination of storage devices such as the volatile memory element described above and the non-volatile memory element. In the storage unit 201, the control program P and data to be referred when performing processing are stored in advance. The control program P corresponds to a program.

Note that, the control program P stored in the storage unit 201 may be the control program P read out from a recording medium 1 that is readable by the in-vehicle ECU 2. In addition, the control program P stored in the storage unit 201 may be stored in the storage unit 201 by the in-vehicle ECU 2 downloading the control program P from an external computer, which is not illustrated and connected to a communication network, which is not illustrated.

The in-vehicle communication unit 202, for example, is an input/output interface using a communication protocol of a controller area network (CAN) or Ethernet (Ethernet/Registered Trademark). The control unit 200 communicates with another in-vehicle ECU 2 connected to the in-vehicle network 4 through the in-vehicle communication unit 202. For example, the in-vehicle ECU 2 may include a plurality of in-vehicle communication units 202. Each of the plurality of in-vehicle communication units 202 is connected to another in-vehicle ECU 2 through the in-vehicle network 4.

Hereinafter, the control unit 200, the storage unit 201, and the in-vehicle communication unit 202 of the in-vehicle ECU 2 functioning as the first relay device 21 will be also referred to as the control unit 200 of the first relay device 21, storage unit 201 of the first relay device 21, and the in-vehicle communication unit 202 of the first relay device 21. Hereinafter, the control unit 200, the storage unit 201, and the in-vehicle communication unit 202 of the in-vehicle ECU 2 functioning as the second relay device 22 will be also referred to as the control unit 200 of the second relay device 22, the storage unit 201 of the second relay device 22, and the in-vehicle communication unit 202 of the second relay device 22.

For example, the in-vehicle ECU 2 functioning as the second relay device 22 includes an input/output interface for communicating with the in-vehicle device 3, which is not illustrated. For example, the in-vehicle device 3 is connected to the input/output interface for communicating with the in-vehicle device 3 through a serial cable.

For example, the in-vehicle ECU 2 includes a connection port for connection with another in-vehicle ECU 2 or the in-vehicle device 3, which is not illustrated. The connection port may be included in the in-vehicle communication unit 202, or may be included in the input/output interface for communicating with the in-vehicle device 3. For example, the connection port includes an existing connection port for connection with the existing in-vehicle device 3, and an additional connection port for connection with the additional in-vehicle device 3. The additional connection port, for example, corresponds to the standard of a universal serial bus (USB). The existing connection port may correspond to the standard of USB. Note that, the connection port may correspond to a standard other than USB. That is, the standard to which the connection port corresponds is not limited to the standard of USB.

An in-vehicle equipment including the in-vehicle ECU 2 and the in-vehicle device 3 is connected to the in-vehicle network 4 through a communication line such as an Ethernet cable, a CAN bus, or a serial cable. In this embodiment, an example is described in which the communication protocol of Ethernet is used in communication through the in-vehicle network 4, but the communication protocol used in the communication through the in-vehicle network 4 is not limited to Ethernet, and for example, may be CAN or a local interconnect network (LIN).

For example, when the additional in-vehicle device 3 is mounted on the vehicle C, the additional in-vehicle device 3 is connected to the additional connection port of the second relay device 22. When the additional in-vehicle device 3 is connected, the control unit 200 of the second relay device 22 communicates with the first relay device 21, and allows the control unit 200 of the first relay device 21 to perform authentication with respect to the additional in-vehicle device 3. In other words, the control unit 200 of the first relay device 21 performs the authentication of the in-vehicle device 3 newly mounted on the vehicle C. For example, the authentication with respect to the in-vehicle device 3 includes storing the information of the in-vehicle device 3, for example, a MAC address and a serial number in the storage unit 201 of the first relay device 21. Hereinafter, an example will be described in which the additional in-vehicle device 3 is connected to one second relay device 22 among two second relay devices 22. In this example, the existing in-vehicle device 3 is connected to the other second relay device 22.

For example, when the in-vehicle device 3 is connected to the additional connection port of the second relay device 22 (the own device), the control unit 200 of the second relay device 22 determines that the authentication with respect to the connected in-vehicle device 3 is required. A method for determining whether the authentication is required is not limited to determination based on the connection to the additional connection port. For example, the information of the in-vehicle device 3 of which the authentication is not required may be stored in advance in the storage unit 201 of at least one in-vehicle ECU 2 mounted on the vehicle C. In a case where the information of the in-vehicle device 3 connected to the second relay device 22 is not included in the information of the in-vehicle device 3 of which the authentication is not required, the control unit 200 of the second relay device 22 may determine that the authentication with respect to the connected in-vehicle device 3 is required. The in-vehicle device 3 of which authentication is not required, for example, includes the in-vehicle device 3 for which at least one of inspection and authentication is performed in advance by a manufacturer manufacturing the vehicle C. In this embodiment, the in-vehicle device 3 of which the authentication is not required is the existing in-vehicle device 3. The in-vehicle device 3 of which the authentication is required is the additional in-vehicle device 3.

In the authentication of the in-vehicle device 3, the control unit 200 of the second relay device 22 relays authentication communication data, which is communication data for authentication, between the first relay device 21 and the in-vehicle device 3. Specifically, the control unit 200 of the second relay device 22 receives (acquires) the authentication communication data from the additional in-vehicle device 3 connected to the second relay device 22, and relays (transmits) the received authentication communication data to the first relay device 21. In addition, the control unit 200 of the second relay device 22 receives the authentication communication data from the first relay device 21, and relays the received authentication communication data to the connected additional in-vehicle device 3. The authentication communication data is authentication information, which is information for authentication, and for example, includes an authentication frame, which is a communication frame for authentication.

The control unit 200 of the first relay device 21 receives the authentication communication data relayed from the second relay device 22. In addition, the control unit 200 of the first relay device 21 transmits the authentication communication data to the additional in-vehicle device 3 through the second relay device 22. The first relay device 21 functions as an authentication server managing the authentication of the in-vehicle device 3 mounted on the vehicle C. For example, after the authentication of the in-vehicle device 3 is completed, the control unit 200 of the first relay device 21 outputs information indicating that the authentication of the in-vehicle device 3 is completed to the second relay device 22, and notifies the second relay device 22 that the authentication of the in-vehicle device 3 is completed.

The transmission and reception of the authentication communication data through the second relay device 22 between the first relay device 21 and the additional in-vehicle device 3 is repeatedly performed until the authentication of the additional in-vehicle device 3 by the first relay device 21 is completed. In other words, the relay of the authentication communication data performed by the second relay device 22 is repeatedly performed until the authentication is completed. Accordingly, the relay of the authentication communication data performed by the second relay device 22 includes a plurality of sequences in which the second relay device transmits and receives the authentication communication data. Note that, the relay of the authentication communication data is performed before the authentication is completed. Before the authentication is completed, for example, includes a period from a time point when the authentication is started to a time point when the authentication is completed.

For example, a flag before authentication indicating that the authentication of the connected in-vehicle device 3 has not been completed is stored in the storage unit 201 of the second relay device 22. The flag before authentication includes an on state and an off state. In a case where the flag before authentication is in the on state, the authentication is not completed. That is, the authentication has not been completed. The flag before authentication in the on state indicates that the authentication of the connected in-vehicle device 3 is not completed. In a case where the flag before authentication is in the off state, the authentication is completed. The flag before authentication in the off state indicates that the authentication of the connected in-vehicle device 3 is completed. In a case where the plurality of in-vehicle devices 3 are connected to the second relay device 22, the flag before authentication may be provided in each of the plurality of in-vehicle devices 3 connected to the second relay device 22.

In the in-vehicle network 4, for example, a mechanism of performing the setting of the in-vehicle network 4 with respect to at least one of the first relay device 21 and the second relay device 22 is introduced such that an arbitrary in-vehicle device 3 configuring the in-vehicle network 4 is capable of performing the transmission and reception of service communication data with respect to at least one of another in-vehicle device 3 and the in-vehicle ECU 2. Specifically, before the authentication is completed, the control unit 200 of the second relay device 22 performs the transmission and reception of communication data relevant to the setting of the in-vehicle network 4 described below with respect to the first relay device 21 and the additional in-vehicle device 3, in parallel with the relay of the authentication communication data described above. For example, the control unit 200 of the second relay device 22 receives the communication data relevant to the setting of the in-vehicle network 4 transmitted from the first relay device 21 or the additional in-vehicle device 3. In addition, the control unit 200 of the second relay device 22 transmits the communication data relevant to the setting of the in-vehicle network 4 to the first relay device 21 or the additional in-vehicle device 3. Note that, performing the transmission and reception of the communication data relevant to the setting of the in-vehicle network 4 by the control unit 200 of the second relay device 22, in parallel with the relay of the authentication communication data, indicates that a period in which the plurality of sequences relevant to the relay of the authentication communication data are executed overlaps with a period in which the transmission and reception of the communication data relevant to the setting of the in-vehicle network 4 is executed.

Before the authentication is completed, the control unit 200 of the second relay device 22 does not perform the relay and the transmission and reception of communication data other than the authentication communication data and the communication data relevant to the setting of the in-vehicle network 4 with respect to the in-vehicle device 3 of which the authentication is required. That is, before the authentication is completed, the control unit 200 of the second relay device 22 restricts the communication with the in-vehicle device 3 of which the authentication is required. Note that, the in-vehicle device 3 of which the authentication is required is the additional in-vehicle device 3. For example, the control unit 200 of the second relay device 22 sets a filter in the additional connection port among the connection ports provided in the second relay device 22 (the own device), and thus, restricts the communication with the in-vehicle device 3 of which the authentication is required, connected to the second relay device 22. In the setting of the filter in the connection port, for example, an access control list (ACL) or the like is used.

The second relay device 22 allows the authentication communication data of which a transmission source or a transmission destination is the additional in-vehicle device 3 connected to the second relay device 22, and the communication data relevant to the setting of the in-vehicle network 4 to pass through by the setting of the filter. The second relay device 22 does not allow communication data of which a transmission source or a transmission destination is the additional in-vehicle device 3 connected to the second relay device 22, which is the communication data other than the authentication communication data and the communication data relevant to the setting of the in-vehicle network 4, to pass through by the setting of the filter. Note that, the pass of the communication data includes the transmission, the reception, and the relay of the communication data.

In a case where the in-vehicle device 3 of which the authentication is not required, for example, the existing in-vehicle device 3 is connected to the second relay device 22, the control unit 200 of the second relay device 22 does not restrict the communication with the existing in-vehicle device 3. The second relay device 22 allows the communication data of which the transmission source or the transmission destination is the existing in-vehicle device 3 connected to the second relay device 22 to pass through. That is, the second relay device 22 relays, and transmits and receives the communication data of which the transmission source or the transmission destination is the existing in-vehicle device 3 connected to the second relay device 22.

The communication data relevant to the setting of the in-vehicle network 4 is communication data for the setting of the in-vehicle network 4. The communication data relevant to the setting of the in-vehicle network 4 corresponds to setting data. The communication data relevant to the setting of the in-vehicle network 4 includes address resolution information, which is information relevant to address resolution. The address resolution includes specifying the MAC address of the first relay device 21, the second relay device 22, or the in-vehicle device 3. In addition, the address resolution includes assigning an address such as an IP address with respect to the additional in-vehicle device 3. The assignment of the address is also referred to as allocation of the address.

For example, a case is considered in which the second relay device 22 functions as a dynamic host configuration protocol (DHCP) server issuing and assigning an address. The additional in-vehicle device 3 is connected to the second relay device 22, and then, outputs an address request for requesting the assignment of the address to the second relay device 22. The control unit 200 of the second relay device 22 acquires the address request output from the additional in-vehicle device 3, and issues the address assigned to the additional in-vehicle device 3. The control unit 200 of the second relay device 22 transmits the issued address to the additional in-vehicle device 3. The IP address is assigned to the additional in-vehicle device 3. In other words, the address resolution is completed. In this case, the address request, and the issued address are included in the address resolution information. In addition, in a case where the second relay device 22 and the in-vehicle device 3 communicate with each other and the MAC addresses thereof are unknown, the resolution of the MAC address using an address resolution protocol (ARP) or the like may be performed. As described above, the address resolution information may include information for specifying the MAC address of the in-vehicle device 3. Note that, the first relay device 21 may function as the DHCP server.

The communication data relevant to the setting of the in-vehicle network 4 includes destination information, a destination information group, and service resolution information, in addition to the address resolution information. The service indicates providing a function by the in-vehicle device 3, and for example, includes driving the actuator 30 and detecting by the sensor 31. The service resolution includes preparation for the in-vehicle device 3 to start the provision of the function. The service resolution information is information for the in-vehicle device 3 to start the provision of the function (the service). The service resolution information is transmitted from the in-vehicle device 3. The service resolution information, for example, includes a device driver for controlling the in-vehicle device 3. When the service resolution is completed, the in-vehicle device 3 is in a state where the provision of the function can be started.

A node includes each in-vehicle equipment configuring the in-vehicle network 4. In this embodiment, the first relay device 21, the second relay device 22, and the in-vehicle device 3 are included in the node. The destination information is information for communicating with each node. For example, the destination information includes an Ethernet switch number, a physical port number of a connection port to which the node is connected, a MAC address of the node, an IP address of the node, and a serial number of the node. The destination information is so-called node information.

The control unit 200 of the second relay device 22 acquires the destination information of the in-vehicle device 3 from the in-vehicle device 3 connected to the second relay device 22. Specifically, in a case where the existing in-vehicle device 3 is connected to the second relay device 22, the control unit 200 of the second relay device 22 acquires the destination information of the connected existing in-vehicle device 3. In a case where the additional in-vehicle device 3 is connected to the second relay device 22, the control unit 200 of the second relay device 22 acquires the destination information of the connected additional in-vehicle device 3. In a case where the existing in-vehicle device 3 and the additional in-vehicle device 3 are connected to the second relay device 22, the control unit 200 of the second relay device 22 acquires the destination information of the connected existing in-vehicle device 3 and additional in-vehicle device 3.

The control unit 200 of the second relay device 22 generates the destination information group including the acquired destination information of the in-vehicle device 3, and the destination information of the second relay device 22 (the own device). The destination information group is information for configuring the in-vehicle network 4, and is generated on the basis of the destination information. For example, the destination information group includes a plurality of destination information pieces.

FIG. 3 is a conceptual diagram illustrating a content example of the destination information group. For example, in the destination information group, the destination information is stored for each node. In the destination information group of FIG. 3, a device name of the node (the in-vehicle ECU 2 and the in-vehicle device 3), a connected Ethernet switch number, a physical port number of the Ethernet switch, and the MAC address, the IP address, and the serial number of the node are stored in association with each other. Specifically, the destination information group of FIG. 3 includes a device name column, an Ethernet switch number column, a physical port number column, a MAC address column, an IP address column, and a serial number column. The Ethernet switch IC corresponds to an Ethernet switch. In this embodiment, the Ethernet switch IC is included in the control unit 200, but the Ethernet switch IC may not be included in the control unit 200. For example, CPU or MPU configuring the control unit 200, and the Ethernet switch IC (the Ethernet switch) may be individually provided. In this case, the control unit 200 allows the Ethernet switch IC (the Ethernet switch) to perform the relay processing.

In the destination information group of FIG. 3, the device names of three in-vehicle equipments of the second relay device 22, the actuator 30, and the sensor 31 are stored in the device name column. Ethernet switch numbers to which each of the second relay device 22 (the control unit 200 of the second relay device 22), the actuator 30, and the sensor 31 is connected are stored in the Ethernet switch number column. The physical port numbers of each of the connection port of the Ethernet switch to which the second relay device 22 (the control unit 200 of the second relay device 22) is connected, the connection port of the Ethernet switch to which the actuator 30 is connected, and the connection port of the Ethernet switch to which the sensor 31 is connected are stored in the physical port number column.

The MAC addresses allocated to each of the second relay device 22 (the control unit 200 of the second relay device 22), the actuator 30, and the sensor 31 are stored in the MAC address column. The IP addresses allocated to each of the second relay device 22, the actuator 30, and the sensor 31 are stored in the IP address column. The serial numbers of each of the second relay device 22, the actuator 30, and the sensor 31 are stored in the serial number column.

The control unit 200 of the second relay device 22 outputs the destination information group generated on the basis of the acquired destination information of the in-vehicle device 3 and the destination information of the second relay device 22, to the first relay device 21. Note that, the acquisition of the destination information of the in-vehicle device 3, and the generation and the output of the destination information group are performed before the authentication is completed. In addition, the control unit 200 of the second relay device 22 relays the service resolution information transmitted from the in-vehicle device 3 to the first relay device 21. The relay of the service resolution information is performed before the authentication is completed.

The control unit 200 of the first relay device 21 acquires the destination information group and the service resolution information output from the second relay device 22. The control unit 200 of the first relay device 21 generates setting information indicating the setting of the in-vehicle network 4, on the basis of the acquired destination information group and service resolution information. The generated setting information indicates the setting of the in-vehicle network 4 including each of the first relay device 21, the second relay device 22, the existing in-vehicle device 3, and the additional in-vehicle device as a node. For example, the setting information includes at least one of route information used in the communication through the in-vehicle network 4 and the relay of the communication, and information relevant to priority control of the communication, in the first relay device 21 and the second relay device 22. The route information is so-called routing table.

A plurality of second relay devices 22 are connected to the first relay device 21. The control unit 200 of the first relay device 21 acquires each destination information group output from each of the plurality of second relay devices 22. The destination information group includes information relevant to association between the in-vehicle communication unit 202 of each of the second relay devices 22 and the in-vehicle device 3 connected to the in-vehicle communication unit 202. In addition, the control unit 200 of the first relay device 21 generates a destination information group including information relevant to association between the in-vehicle communication unit 202 of the first relay device 21 and each of the second relay devices 22 connected to the in-vehicle communication unit 202. The destination information group generated by the control unit 200 of the first relay device 21, for example, includes the destination information of the first relay device 21, and the destination information of the second relay device 22 connected to the first relay device 21. Note that, in the following description, the description of the generation of the destination information group by the control unit 200 of the first relay device 21 will be omitted.

The control unit 200 of the first relay device 21 extracts which in-vehicle communication unit 202 in which second relay device 22 each of the in-vehicle devices 3 is connected, on the basis of the Ethernet switch number and the physical port number of the information relevant to the association included in the generated destination information group, and the information relevant to the association included in the destination information group acquired from the second relay device 22. The control unit 200 of the first relay device 21 specifies the number of in-vehicle devices 3 corresponding to the node in the in-vehicle network 4, and the communication unit of the second relay device 22 to which the in-vehicle device 3 is directly connected, and derives the route information based on a connection relationship between the second relay device 22 and the in-vehicle device 3. The control unit 200 of the first relay device 21 derives a setting value relevant to the required route of the in-vehicle network 4, the degree of communication priority according to the required bandwidth or the required throughput amount of each route, and the like, on the basis of attribute information relevant to the specification type of the in-vehicle device 3, such as the serial number of the in-vehicle device 3, and the service resolution information of the in-vehicle device 3. The control unit 200 of the first relay device 21 generates the setting information indicating the setting of the in-vehicle network 4 by the derived route information and setting value. The control unit 200 of the first relay device 21 stores the generated setting information in the storage unit 201 of the first relay device 21.

The control unit 200 of the first relay device 21 may update the previously used setting information, or the setting information prepared as the initial value, on the basis of the destination information group and the service resolution information of the in-vehicle device 3, which are currently acquired, to generate setting information to be currently used. For example, a plurality of setting information pieces according to the using pattern of the in-vehicle network 4 may be prepared in advance, and the control unit 200 may select any setting information from the plurality of setting information pieces, in accordance with the currently acquired destination information group, to generate the setting information to be currently used. That is, the generation of the setting information includes updating the existing setting information and selecting any setting information among the plurality of setting information pieces prepared in advance, in addition to generating the setting information on the basis of the destination information group and the service resolution information of the in-vehicle device 3.

For example, in the generation of the setting information, the control unit 200 of the first relay device 21 may transmit the acquired destination information group to an external server, which is not illustrated and connected to the first relay device 21 such that communication is available. The external server transmits the setting information according to the destination information group transmitted from the first relay device 21 to the first relay device 21. The control unit 200 of the first relay device 21 acquires the setting information transmitted from the external server.

The control unit 200 of the first relay device 21 outputs the generated setting information to the second relay device 22. The generation and the output of the setting information by the control unit 200 of the first relay device 21, for example, are performed before the authentication is completed. Before the authentication is completed, the control unit 200 of the second relay device 22 acquires the setting information output from the first relay device 21. The control unit 200 of the second relay device 22 acquires the setting information, and then, stands by until the authentication is completed. After the authentication is completed, the control unit 200 of the second relay device 22 applies the acquired setting information to the second relay device 22. For example, since the setting information acquired from the first relay device 21 includes the setting of the filter for releasing the restriction of the communication with the additional in-vehicle device 3 and also includes setting relevant to the priority control of the route or the communication, in addition to the setting of the filter for releasing the restriction of the communication, the control unit 200 of the second relay device 22 changes the setting of the filter in the connection port of the second relay device 22, on the basis of the acquired setting information. In other words, the control unit 200 of the second relay device 22 sets the filter on the basis of the acquired setting information. For example, the control unit 200 of the second relay device 22 releases the restriction of the communication with the additional in-vehicle device 3, in accordance with a change in the setting of the filter in the second relay device 22. Note that, after the authentication is completed, the control unit 200 of the second relay device 22 may set the filter for releasing the restriction of the communication with the in-vehicle device 3, in accordance with a condition set in advance in the control unit 200 of the second relay device 22.

The control unit 200 of the second relay device 22 applies the setting information to the second relay device 22 to set the in-vehicle network 4 based on the setting information in the vehicle C. Specifically, in the vehicle C, the in-vehicle network 4 including each of the first relay device 21, the second relay device 22, the existing in-vehicle device 3, and the additional in-vehicle device 3 as a node is set. The setting information is reflected on the in-vehicle network 4. After the setting of the in-vehicle network 4 is completed, the control unit 200 of the second relay device 22 outputs setting completion information indicating that the setting of the in-vehicle network 4 is completed to the first relay device 21.

After the authentication is completed, the control unit 200 of the second relay device 22 starts the relay based on the acquired setting information. In other words, after the authentication is completed, the control unit 200 of the second relay device 22 performs the communication based on the acquired setting information. For example, after the in-vehicle network 4 is set, the restriction of the communication with the additional in-vehicle device 3 in the second relay device 22 is released as described above, and thus, the communication data of which the transmission source or the transmission destination is the additional in-vehicle device 3 connected to the second relay device 22 passes through the second relay device 22 without being restricted.

For example, after the authentication is completed, the control unit 200 of the second relay device 22 receives the service communication data transmitted from the in-vehicle device 3. In addition, after the authentication is completed, the control unit 200 of the second relay device 22 transmits the service communication data to the in-vehicle device 3. The service communication data is communication data for the in-vehicle device 3 to provide a function, and includes information relevant to a service, such as a drive signal for driving the actuator 30 and a detected value of the sensor 31.

For example, in a case where the existing in-vehicle device 3 and the additional in-vehicle device 3 are connected to the second relay device 22, the second relay device 22 sets the in-vehicle network 4, and then, allows the communication data of which the transmission source or the transmission destination is the existing in-vehicle device 3, and the communication data of which the transmission source or the transmission destination is the additional in-vehicle device 3 to pass through.

Even after the authentication is completed, the control unit 200 of the second relay device 22 may acquire the destination information of the in-vehicle device 3, and may output the destination information group generated on the basis of the acquired destination information of the in-vehicle device 3 to the first relay device 21. The control unit 200 of the first relay device 21 acquires the destination information group output from the second relay device 22. In a case where the acquired destination information group is updated, the control unit 200 of the first relay device 21 generates new setting information, on the basis of the acquired destination information group. The control unit 200 of the first relay device 21 outputs the generated new setting information to the second relay device 22. The control unit 200 of the second relay device 22 acquires the new setting information output from the first relay device 21, and performs communication on the basis of the new setting information. Even in a case where the destination information is changed after the authentication is completed, it is possible to set the in-vehicle network 4 according to the changed destination information.

Figure 4:
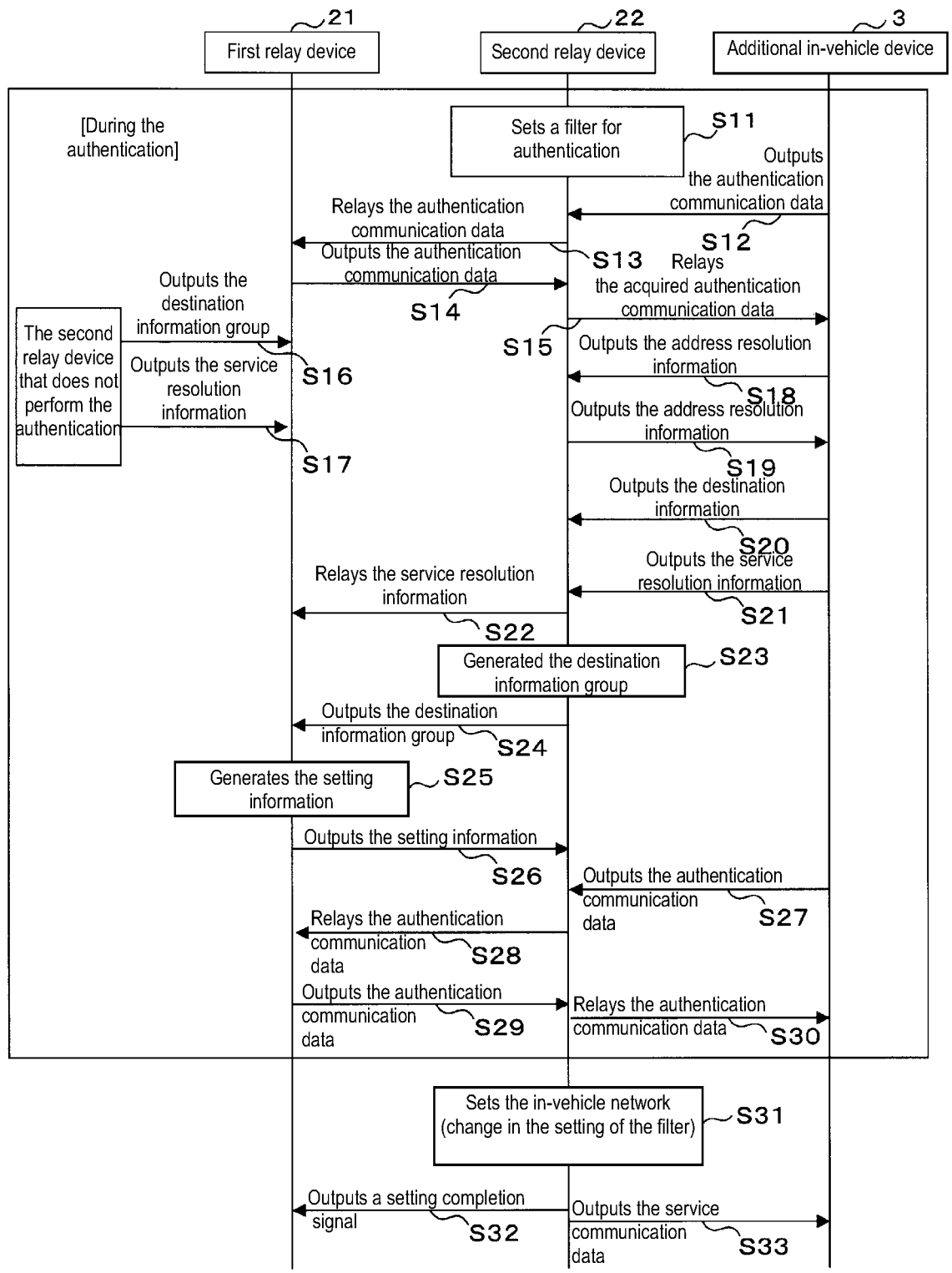
FIG. 4 is a sequence diagram illustrating one aspect of authentication of an in-vehicle device and setting of an in-vehicle network.

FIG. 4 is a sequence diagram illustrating one aspect of the authentication of the in-vehicle device 3 and the setting of the in-vehicle network 4. In FIG. 4, processing according to the authentication of the in-vehicle device 3 and processing according to the setting of the in-vehicle network 4 will be described by using the sequence diagram including the first relay device 21, the second relay device 22, and the in-vehicle device 3.

In the example of FIG. 4, the additional in-vehicle device 3 is connected to one second relay device 22 among two second relay devices 22. The existing in-vehicle device 3 is connected to the other second relay device 22 among two second relay devices 22. In FIG. 4, one second relay device 22 is indicated as the second relay device 22. The other second relay device 22 is indicated as the second relay device 22 that does not perform the authentication of the in-vehicle device 3. In FIG. 4, in order to simplify the description, one additional in-vehicle device 3 is collectively illustrated. The existing in-vehicle device 3 is not illustrated. Hereinafter, steps will be abbreviated as S.

For example, when an ignition (IG) switch, which is not illustrated and provided in the vehicle C, is in a stop state, the additional in-vehicle device 3 is connected to the second relay device 22. When the IG switch is transitioned to a start state from the stop state, the first relay device 21, the second relay device 22, and the in-vehicle device 3 are started.

Since the additional in-vehicle device 3 is connected to the second relay device 22, as described above, it is determined that the second relay device 22 is connected to the in-vehicle device 3 of which the authentication is required. The authentication of the additional in-vehicle device 3 is started. The second relay device 22 sets a filter for authentication with respect to the additional in-vehicle device 3 in the connection port (S11). Specifically, the second relay device 22 sets the filter in the connection port such that two types of communication data pieces of the authentication communication data of which the transmission source or the transmission destination is the additional in-vehicle device 3 and the communication data relevant to the setting of the in-vehicle network 4 pass through, and communication data other than the two types of communication data pieces does not pass through. The communication with the additional in-vehicle device 3 is restricted as described above.

In order for the authentication of the additional in-vehicle device 3, the additional in-vehicle device 3 outputs the authentication communication data to the second relay device 22 (S12). The second relay device 22 acquires the authentication communication data output from the additional in-vehicle device 3, and relays the acquired authentication communication data to the first relay device 21 (S13). The first relay device 21 acquires the relayed authentication communication data, and performs various processing pieces for authentication, on the basis of the acquired authentication communication data. In addition, the first relay device 21 outputs the authentication communication data to the second relay device 22 (S14). For example, the authentication communication data output from the first relay device 21 includes communication data for a response with respect to the authentication communication data output from the additional in-vehicle device 3. The second relay device 22 acquires the authentication communication data output from the first relay device 21, and relays the acquired authentication communication data to the additional in-vehicle device 3 (S15).

The transmission and reception of the authentication communication data through the second relay device 22 is repeated between the first relay device 21 and the additional in-vehicle device 3, until the authentication is completed. In other words, the second relay device 22 relays the authentication communication data between the first relay device 21 and the additional in-vehicle device 3, until the authentication is completed.

The second relay device 22 that does not perform the authentication of the in-vehicle device 3 outputs the destination information group including the destination information of the second relay device 22 that does not perform the authentication of the in-vehicle device 3, and the destination information of the existing in-vehicle device 3 connected to the second relay device 22 that does not perform the authentication of the in-vehicle device 3 to the first relay device 21 (S16). In addition, the second relay device 22 that does not perform the authentication of the in-vehicle device 3 outputs the service resolution information transmitted from the existing in-vehicle device 3 connected to the second relay device 22 that does not perform the authentication of the in-vehicle device 3 to the first relay device 21 (S17). The first relay device 21 acquires the destination information group and the service resolution information output from the second relay device 22 that does not perform the authentication of the in-vehicle device 3.

After the authentication of the additional in-vehicle device 3 is completed, the additional in-vehicle device 3 outputs the address resolution information to the second relay device 22 (S18). For example, the additional in-vehicle device 3 outputs the address request to the second relay device 22. The second relay device 22 acquires the address resolution information output from the additional in-vehicle device 3. The second relay device 22 outputs the address resolution information to the additional in-vehicle device 3 (S19). For example, the address resolution information output from the second relay device 22 includes communication data for a response with respect to the address resolution information output from the additional in-vehicle device 3. For example, the second relay device 22 outputs the address issued to the additional in-vehicle device 3 to the additional in-vehicle device 3.

The additional in-vehicle device 3 outputs the destination information of the additional in-vehicle device 3, so-called own node information, to the second relay device 22 (S20). In addition, the additional in-vehicle device 3 outputs the service resolution information to the second relay device 22 (S21).

The second relay device 22 acquires the destination information and the service resolution information of the additional in-vehicle device 3, output from the additional in-vehicle device 3. The second relay device 22 relays the acquired service resolution information to the first relay device 21 (S22). In addition, the second relay device 22 generates the destination information group including the acquired destination information of the additional in-vehicle device 3 and destination information of the second relay device 22 (S23). In other words, the second relay device 22 generates the destination information group, on the basis of the acquired destination information of the additional in-vehicle device 3 and destination information of the second relay device 22. The second relay device 22 outputs the generated destination information group to the first relay device 21 (S24).

The first relay device 21 acquires the destination information group output from the second relay device 22. The first relay device 21 generates the setting information, on the basis of the acquired destination information group (S25). Specifically, the first relay device 21 generates the setting information, on the basis of the destination information group and the service resolution information acquired from the second relay device 22, and the destination information group and the service resolution information acquired from the second relay device 22 that does not perform the authentication of the in-vehicle device 3. In other words, the first relay device 21 performs examination relevant to the setting of the in-vehicle network 4, on the basis of two destination information groups and two service resolution information pieces. For example, the first relay device 21 selects the setting information according to the acquired destination information group and service resolution information, among the plurality of setting information pieces stored in advance in the storage unit 201 of the first relay device 21. The first relay device 21 outputs the generated setting information to the second relay device 22 connected to the additional in-vehicle device 3 (S26). The first relay device 21 may output the generated setting information to the second relay device 22 connected to the additional in-vehicle device 3 and the second relay device 22 that does not perform the authentication of the in-vehicle device 3.

The second relay device 22 acquires the setting information output from the first relay device 21, and stands by for the completion of the authentication. Specifically, the second relay device 22 stands by for the completion of the authentication of all of the additional in-vehicle devices 3 connected to the second relay device 22. The second relay device 22 relays the authentication communication data until the authentication is completed. For example, the additional in-vehicle device 3 outputs the authentication communication data to the second relay device 22 (S27). The second relay device 22 acquires the authentication communication data output from the additional in-vehicle device 3, and relays the acquired authentication communication data to the first relay device 21 (S28). The first relay device 21 outputs the authentication communication data to the second relay device 22 (S29). The second relay device 22 acquires the authentication communication data output from the first relay device 21, and relays the acquired authentication communication data to the additional in-vehicle device 3 (S30).

The authentication communication data is transmitted and received between the first relay device 21 and the additional in-vehicle device 3 through the second relay device, and thus, the authentication of the additional in-vehicle device 3 is completed. After the authentication is completed, the second relay device 22 applies the setting information acquired from the first relay device 21 to the second relay device (the own device), and thus, sets the in-vehicle network 4 to which the additional in-vehicle device 3 is added as a node, in the vehicle C (S31). Since the application of the setting information by the second relay device 22 includes changing the setting of the filter in the connection port of the second relay device to the setting according to the setting information by the second relay device, the restriction of the communication with the additional in-vehicle device 3 is released. Note that, in FIG. 4, the in-vehicle network 4 is described as an in-vehicle NW (network).

The second relay device outputs a setting completion signal indicating that the setting of the in-vehicle network 4 is completed to the first relay device 21 (S32), and notifies the first relay device 21 that the setting of the in-vehicle network 4 is completed.

Since the restriction of the communication with the additional in-vehicle device 3 is released, the second relay device outputs the service communication data to the additional in-vehicle device 3 (S33). In addition, the second relay device receives the service communication data output from the additional in-vehicle device 3. The second relay device may relay the service communication data output from the first relay device 21 to the additional in-vehicle device 3, and may relay the service communication data output from the additional in-vehicle device 3 to the first relay device 21.

As described above, after the authentication is completed, the second relay device performs communication through the in-vehicle network 4 based on the setting information acquired from the first relay device 21. That is, the second relay device performs the communication based on the setting information acquired from the first relay device 21 after the authentication is completed. The second relay device performs the relay, and the transmission and reception of the communication data of which the transmission source or the transmission destination is the additional in-vehicle device 3, other than the authentication communication data and the communication data relevant to the setting of the in-vehicle network 4, for example, the service communication data, in addition to the authentication communication data and the communication data relevant to the setting of the in-vehicle network 4.

From the time point when the authentication is started to the time point when the authentication is completed, the authentication communication data is transmitted and received a plurality of times. From the time point when the authentication is started to the time point when the authentication is completed, the address resolution information may be transmitted and received a plurality of times, until the address resolution is completed. For example, the address resolution completed from the time point when the authentication is started to the time point when the authentication is completed. From the time point when the authentication is started to the time point when the authentication is completed, at least one of the destination information, the destination information group, and the service resolution information may be transmitted and received a plurality of times. For example, from the time point when the authentication is started to the time point when the authentication is completed, the service resolution information may be transmitted and received a plurality of times, until the service resolution is completed. For example, the service resolution is completed from the time point when the authentication is started to the time point when the authentication is completed.

For example, after the authentication is completed, the in-vehicle device 3 outputs the destination information periodically, for example, at a constant period. After the authentication is completed, the second relay device 22 outputs the destination information group including the acquired destination information and the destination information of the second relay device 22 to the first relay device 21 whenever acquiring the periodically output destination information. In other words, the second relay device 22 periodically outputs the destination information group to the first relay device 21. The second relay device 22 may acquire the periodically output destination information, and may output the destination information group including the acquired destination information and the destination information of the second relay device 22 to the first relay device 21 in a case where the acquired destination information is changed from the previously acquired destination information. Note that, before the authentication is completed, the in-vehicle device 3 may periodically output the destination information. Before the authentication is completed, the second relay device 22 may periodically output the destination information group.

Even after the authentication is completed, the first relay device 21 acquires the destination information group output from the second relay device 22, and generates the setting information, on the basis of the acquired destination information group. The first relay device 21 outputs the generated setting information to the second relay device 22. The second relay device 22 applies the setting information output from the first relay device 21. Even in a case where the destination information is changed after the authentication is completed, it is possible to set the in-vehicle network 4 according to the changed destination information.

Figure 5:
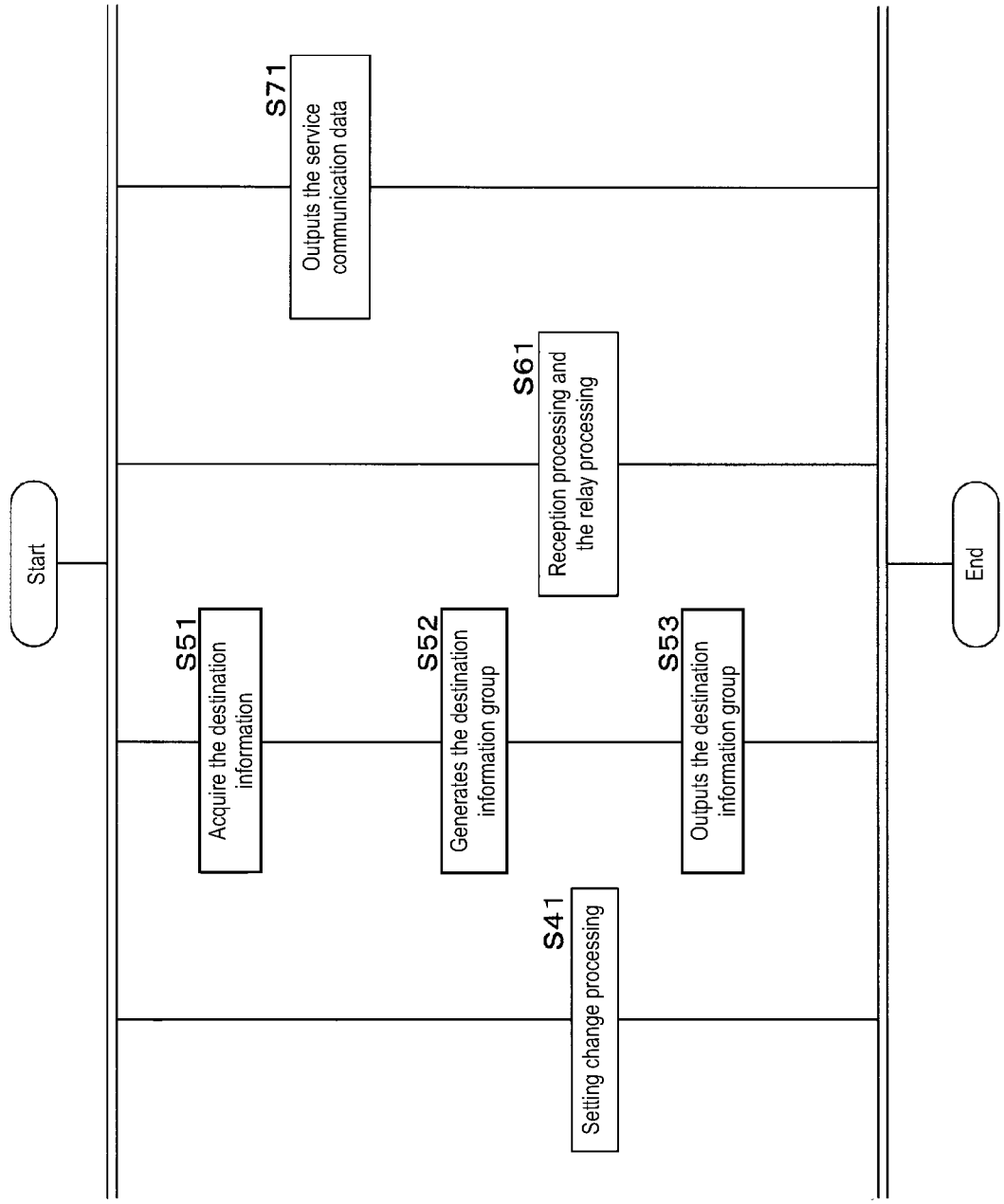
FIG. 5 is a flowchart of a main routine illustrating processing according to the authentication of the in-vehicle device and the setting of the in-vehicle network performed by a control unit of a second relay device.
Figure 6:
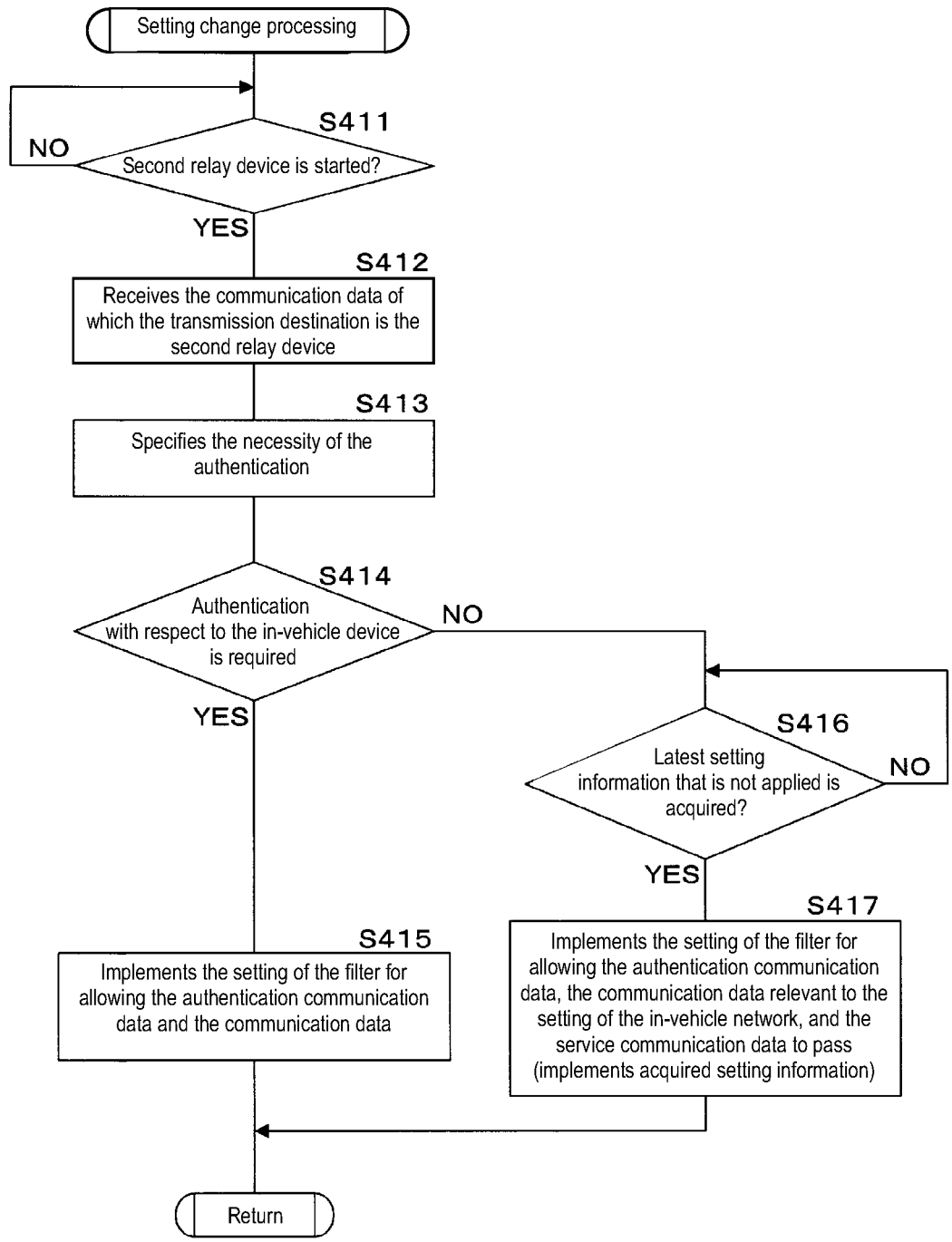
FIG. 6 is a flowchart illustrating a processing procedure of the control unit of the second relay device according to a subroutine of setting change processing.
Figure 7:
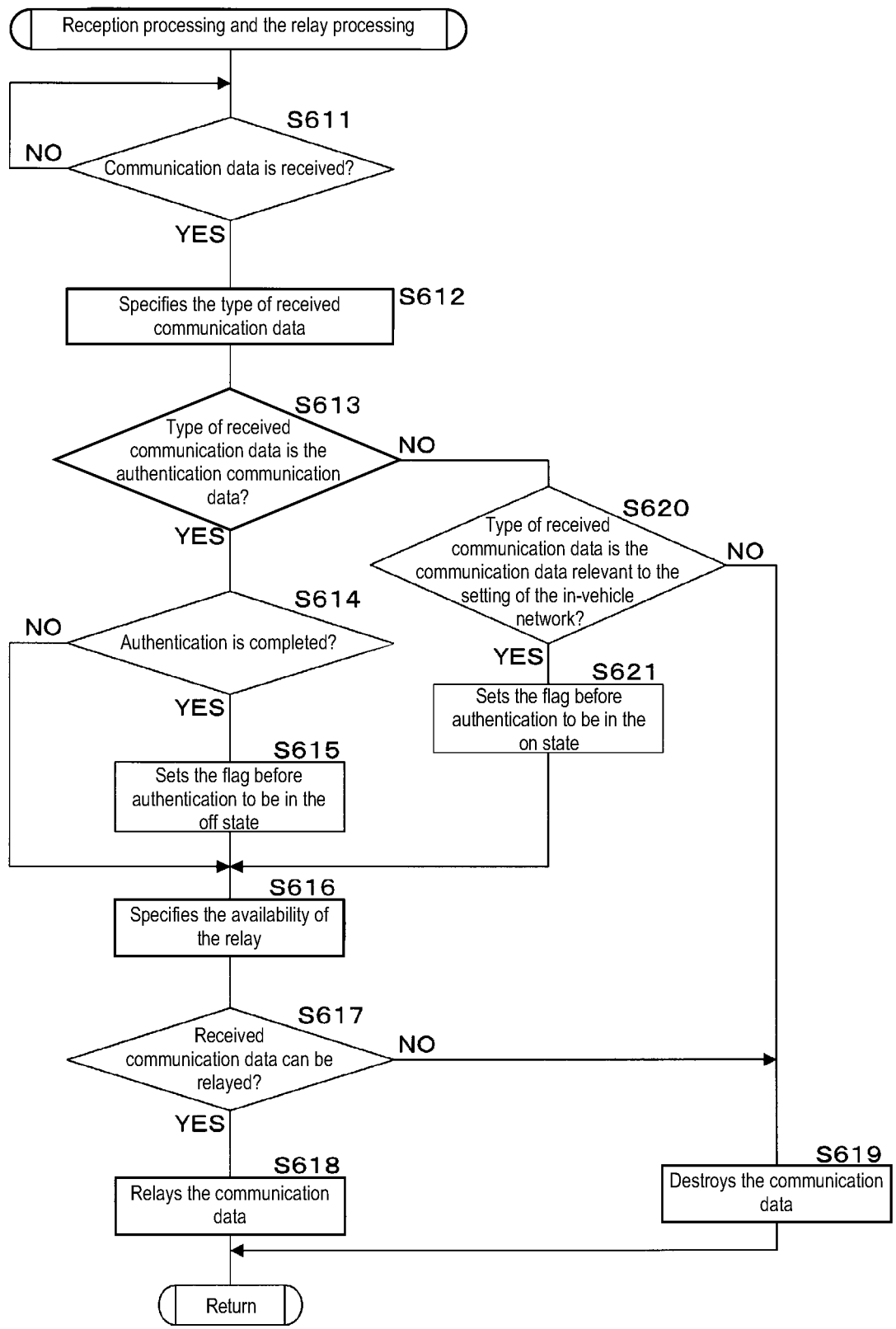
FIG. 7 is a flowchart illustrating a processing procedure of the control unit of the second relay device according to a subroutine of reception processing and relay processing.

FIG. 5 is a flowchart of the main routine illustrating the processing according to the authentication of the in-vehicle device 3 and the setting of the in-vehicle network 4 performed by the control unit 200 of the second relay device 22. FIG. 6 is a flowchart illustrating the processing procedure of the control unit 200 of the second relay device 22 according to the subroutine of setting change processing. FIG. 7 is a flowchart illustrating the processing procedure of the control unit 200 of the second relay device 22 according to the subroutine of reception processing and relay processing. For example, the control unit 200 of the second relay device 22 performs the following processing when the IG switch of the vehicle C is transitioned to the start state from the stop state.

FIG. 5 illustrates the processing according to the authentication of the in-vehicle device 3 and the setting of the in-vehicle network 4 performed by the control unit 200 of the second relay device 22. First, the processing according to the subroutine of the setting change processing performed by the control unit 200 of the second relay device 22 will be described by using FIG. 5 and FIG. 6. As illustrated in FIG. 5, the control unit 200 of the second relay device 22 calls and executes the subroutine of the setting change processing (S41). As illustrated in FIG. 6, the control unit 200 of the second relay device 22 determines whether the second relay device 22 (the own device) is started (S411). For example, when executing the subroutine of the setting change processing, for check, the control unit 200 of the second relay device 22 determines whether the second relay device 22 is started. In a case where the second relay device 22 is not started (S411: NO), the control unit 200 of the second relay device 22 performs loop processing to perform again the processing of S411. When performing the loop processing, the control unit 200 of the second relay device 22 may execute standby processing for a predetermined time.

In a case where the second relay device 22 is started (S411: YES), the control unit 200 of the second relay device 22 receives the communication data of which the transmission destination is the second relay device 22 (S412). For example, the control unit 200 of the second relay device 22 does not receive or destroys the communication data of which the transmission destination is not the second relay device 22.

The control unit 200 of the second relay device 22 specifies the necessity of the authentication with respect to the in-vehicle device 3 connected to the second relay device 22 (S413). In other words, the control unit 200 of the second relay device 22 determines the necessity of the authentication with respect to the in-vehicle device 3 connected to the second relay device 22. For example, the control unit 200 of the second relay device 22 specifies the necessity of the authentication with respect to the in-vehicle device 3, on the basis of simple communication transaction executed between the second relay device 22 and the in-vehicle device 3 connected to the second relay device 22. The simple communication transaction described above is defined in advance.

The control unit 200 of the second relay device 22 may acquire (receive) registration information of the in-vehicle device 3 output from the in-vehicle device 3 connected to the second relay device 22, and may specify the necessity of the authentication with respect to the in-vehicle device 3, on the basis of the registration information of the acquired in-vehicle device 3. The registration information is information registered in the second relay device 22, and for example, includes an identifier such as an ID number of the in-vehicle device 3, the MAC address, and the IP address. For example, when the authentication of the in-vehicle device 3 is completed, the registration information of the in-vehicle device 3 is registered. For example, the registration of the registration information indicates that the registration information is stored in the storage unit 201 of the second relay device 22. When the same registration information as the registration information acquired from the in-vehicle device 3 connected to the second relay device 22 is registered in the second relay device 22, the control unit 200 of the second relay device 22 specifies that the authentication is not required. When the same registration information as the registration information acquired from the in-vehicle device 3 connected to the second relay device 22 is not registered in the second relay device 22, the control unit 200 of the second relay device 22 specifies that the authentication is required.

The control unit 200 of the second relay device 22 determines whether the authentication with respect to the in-vehicle device 3 connected to the second relay device 22 is required (S414). In a case where the authentication with respect to the in-vehicle device 3 is required (S414: YES), the control unit 200 of the second relay device 22 implements the setting of the filter for allowing the authentication communication data and the communication data relevant to the setting of the in-vehicle network 4 to pass through the connection port of the second relay device 22 (S415). In other words, the control unit 200 of the second relay device 22 sets the filter for restricting the communication with the in-vehicle device 3 of which the authentication is required in the connection port of the second relay device 22. A case where the authentication with respect to the in-vehicle device 3 is required includes a case where the authentication with respect to the in-vehicle device 3 is not completed. The control unit 200 of the second relay device 22 returns to the main routine. Note that, in FIG. 6, the in-vehicle network 4 is described as the in-vehicle NW. The same applies to FIG. 7.

In a case where the authentication with respect to the in-vehicle device 3 is not required (S414: NO), the control unit 200 of the second relay device 22 determines whether the latest setting information that is not applied to the in-vehicle network 4 is acquired from the first relay device 21 (S416). Specifically, the control unit 200 of the second relay device 22 determines whether the most lately acquired setting information among the setting information acquired from the first relay device 21 is applied to the in-vehicle network 4. For example, when the latest setting information that is not applied to the in-vehicle network 4 is transmitted to the second relay device 22 from the first relay device 21, a setting change request for requesting a change in the setting is transmitted to the second relay device 22 from the first relay device 21. When the setting change request transmitted from the first relay device 21 is acquired, the control unit 200 of the second relay device 22 determines that the latest setting information that is not applied to the in-vehicle network 4 is acquired. Note that, a case where the authentication with respect to the in-vehicle device 3 is not required includes a case where the authentication with respect to the in-vehicle device 3 is completed.

In a case where the latest setting information that is not applied is not acquired (S416: NO), that is, in a case where the most lately acquired setting information is applied to the in-vehicle network 4, the control unit 200 of the second relay device 22 performs the loop processing to perform again the processing of S416. When performing the loop processing, the control unit 200 of the second relay device 22 may execute the standby processing for a predetermined time.

In a case where the latest setting information that is not applied is acquired (S416: YES), that is, the most lately acquired setting information is not applied to the in-vehicle network 4, the control unit 200 of the second relay device 22 performs the following processing. The control unit 200 of the second relay device 22 implements the setting of the filter for allowing the authentication communication data, the communication data relevant to the setting of the in-vehicle network 4, and the service communication data to pass through the connection port of the second relay device 22 (S417). Specifically, the control unit 200 of the second relay device 22 may be attained by applying (setting) the latest setting information that is not applied. In other words, the control unit 200 of the second relay device 22 may implement the acquired latest setting information. Since the setting information described above includes the setting of the filter for allowing the communication data relevant to the setting of the in-vehicle network 4 and the service communication data to pass through, the control unit 200 of the second relay device 22 implements the setting of the filter not for restricting the communication with the in-vehicle device 3, in the connection port of the second relay device 22. The control unit 200 of the second relay device 22 returns to the main routine.

As illustrated in FIG. 5, the control unit 200 of the second relay device 22 ends the processing. The control unit 200 of the second relay device 22 may perform again the processing of S41, instead of ending the processing. The control unit 200 of the second relay device 22 may perform the standby processing for a predetermined time, and then, may perform again the processing of S41.

The processing according to the destination information performed by the control unit 200 of the second relay device 22 will be described by using FIG. 5. In a case where the destination information of the in-vehicle device 3 is acquired from the in-vehicle device 3 connected to the second relay device 22 (S51), the control unit 200 of the second relay device 22 generates the destination information group including the acquired destination information and the destination information of the second relay device 22 (S52). Next, the control unit 200 of the second relay device 22 outputs the generated destination information group to the first relay device 21 (S53), and ends the processing. The control unit 200 of the second relay device 22 may perform again the processing of S51, instead of ending the processing. The control unit 200 of the second relay device 22 may perform the standby processing for a predetermined time, and then, may perform again the processing of S51. For example, the control unit 200 of the second relay device 22 performs again the processing of S51 to periodically perform the acquisition of the destination information, and the generation and the output of the destination information group.

The processing according to the subroutine of the reception processing and the relay processing performed by the control unit 200 of the second relay device 22 will be described by using FIG. 5 and FIG. 7. As illustrated in FIG. 5, the control unit 200 of the second relay device 22 calls and executes the subroutine of the reception processing and the relay processing (S61). As illustrated in FIG. 7, the control unit 200 of the second relay device 22 determines whether the communication data is received (S611). The communication data includes a communication frame such as an Etherframe. In a case where the communication data is not received (S611: NO), the control unit 200 of the second relay device 22 performs the loop processing to perform again the processing of S611. When performing the loop processing, the control unit 200 of the second relay device 22 may execute the standby processing for a predetermined time.

In a case where the communication data is received (S611: YES), the control unit 200 of the second relay device 22 specifies the type of received communication data (S612). In other words, the control unit 200 of the second relay device 22 checks the type of received communication data. For example, the control unit 200 of the second relay device 22 specifies the Ethertype of received communication frame. The control unit 200 of the second relay device 22 determines whether the type of received communication data is the authentication communication data (S613).

In a case where the type of communication data is the authentication communication data (S613: YES), the control unit 200 of the second relay device 22 determines whether the authentication of the in-vehicle device 3 connected to the second relay device 22 is completed (S614). For example, when information indicating that the authentication of the in-vehicle device 3 is completed, which is output from the first relay device 21, is acquired, the control unit 200 of the second relay device 22 determines that the authentication is completed. When the information indicating that the authentication is completed is not acquired, the control unit 200 of the second relay device 22 determines that the authentication is not completed. For example, when the registration information of the in-vehicle device 3 connected to the second relay device 22 is stored in the storage unit 201 of the second relay device 22, the control unit 200 of the second relay device 22 may determine that the authentication is completed. In addition, when the registration information is not stored in the storage unit 201 of the second relay device 22, the control unit 200 of the second relay device 22 may determine that the authentication is not completed.

In a case where the authentication is not completed (S614: NO), the control unit 200 of the second relay device 22 performs the processing of S616 described below. In a case where the authentication is completed (S614: YES), the control unit 200 of the second relay device 22 sets the flag before authentication to be in the off state (S615). The control unit 200 of the second relay device 22, for example, specifies the availability of the relay of the received communication data, with reference to a MAC address table (S616), and determines whether the received communication data can be relayed (S617). In other words, the control unit 200 of the second relay device 22 checks the availability of the relay of the communication data, and determines whether the communication data can be relayed.

For example, the MAC address table is stored in the storage unit 201 of the second relay device 22. In the MAC address table, the MAC address of at least a part of the in-vehicle equipment among the in-vehicle equipment including the first relay device 21, the second relay device 22, and the in-vehicle device 3 mounted on the vehicle C is stored. In addition, in the MAC address table, the port number of the connection port connected to another in-vehicle equipment in the second relay device 22 is stored.

For example, when information for relaying the received communication data is stored in the MAC address table, the control unit 200 of the second relay device 22 specifies that the received communication data is capable of being relayed. In addition, when the information for relay is not stored in the MAC address table, the control unit 200 of the second relay device 22 specifies that the received communication data is not capable of being relayed. For example, the information for relaying the communication data includes transmission destination information and transmission source information. For example, the transmission destination information includes the MAC address of the in-vehicle equipment that is the transmission destination or a relay destination of the communication data, and the port number of the connection port connected to the in-vehicle equipment that is the transmission destination or the relay destination. For example, the transmission source information includes the MAC address of the in-vehicle equipment that is the transmission source of the communication data, and the port number of the connection port connected to the in-vehicle equipment that is the transmission source.

In a case where the received communication data is capable of being relayed (S617: YES), that is, in a case where both of the transmission destination information and the transmission source information of the received communication data are stored in the MAC address table, the control unit 200 of the second relay device 22 relays the received communication data (S618). In other words, the control unit 200 of the second relay device 22 transmits the received communication data. The control unit 200 of the second relay device 22 returns to the main routine.

In a case where the received communication data is not capable of being relayed (S617: NO), that is, in a case where both of the transmission destination information and the transmission source information of the received communication data are not stored in the MAC address table, the control unit 200 of the second relay device 22 destroys the received communication data (S619). The control unit 200 of the second relay device 22 returns to the main routine.

In a case where the type of communication data is not the authentication communication data (S613: NO), the control unit 200 of the second relay device 22 determines whether the type of received communication data is the communication data relevant to the setting of the in-vehicle network 4 (S620). In a case where the type of communication data is the communication data relevant to the setting of the in-vehicle network 4 (S620: YES), the control unit 200 of the second relay device 22 sets the flag before authentication to be in the on state (S621), and performs the processing of S616.

In a case where the type of communication data is not the communication data relevant to the setting of the in-vehicle network 4 (S620: NO), the control unit 200 of the second relay device 22 performs the processing of S619. In a case where the type of communication data is not the communication data relevant to the setting of the in-vehicle network 4, the control unit 200 of the second relay device 22 may determine whether the authentication of the in-vehicle device 3 connected to the second relay device 22 is completed. When the authentication is completed, the control unit 200 of the second relay device 22 performs the processing of S616. When the authentication is not completed, the control unit 200 of the second relay device 22 performs the processing of S619.

As illustrated in FIG. 5, the control unit 200 of the second relay device 22 that has returned to the main routine ends the processing. The control unit 200 of the second relay device 22 may perform again the processing of S61, instead of ending the processing. The control unit 200 of the second relay device 22 may perform the standby processing for a predetermined time, and then, may perform again the processing of S61.

The processing according to the service communication data performed by the control unit 200 of the second relay device 22 will be described by using FIG. 5. The control unit 200 of the second relay device 22 outputs the service communication data to the in-vehicle device 3 connected to the second relay device 22 (S71). Specifically, before the authentication is completed, as described above, the communication with the in-vehicle device 3 is restricted by the setting of the filter, and thus, the service communication data is not output before the authentication is completed. After the authentication is completed, the service communication data is output.

The control unit 200 of the second relay device 22 may determine whether the authentication of the in-vehicle device 3 connected to the second relay device 22 is completed, and may perform the processing of S71, in accordance with a determination result. When the authentication is not completed, the control unit 200 of the second relay device 22 performs the loop processing to perform again the determination described above. When the authentication is completed, the control unit 200 of the second relay device 22 performs the processing of S71. Note that, determining whether the authentication of the in-vehicle device 3 is completed, for example, may be performed on the basis of the flag before authentication. For example, in a case where the plurality of in-vehicle devices 3 are connected to the second relay device 22, the control unit 200 of the second relay device 22 performs the determination described above and the processing of S71 with respect to each of the plurality of connected in-vehicle devices 3.

The control unit 200 of the second relay device 22 ends the processing. The control unit 200 of the second relay device 22 may perform again the processing of S71, instead of ending the processing. The control unit 200 of the second relay device 22 may perform the standby processing for a predetermined time, and then, may perform again the processing of S71.

The control unit 200 of the second relay device 22 performs the processing of S41, the processing of S51, S52, and S53, the processing of S61, and the processing of S71 in parallel.

Figure 8:
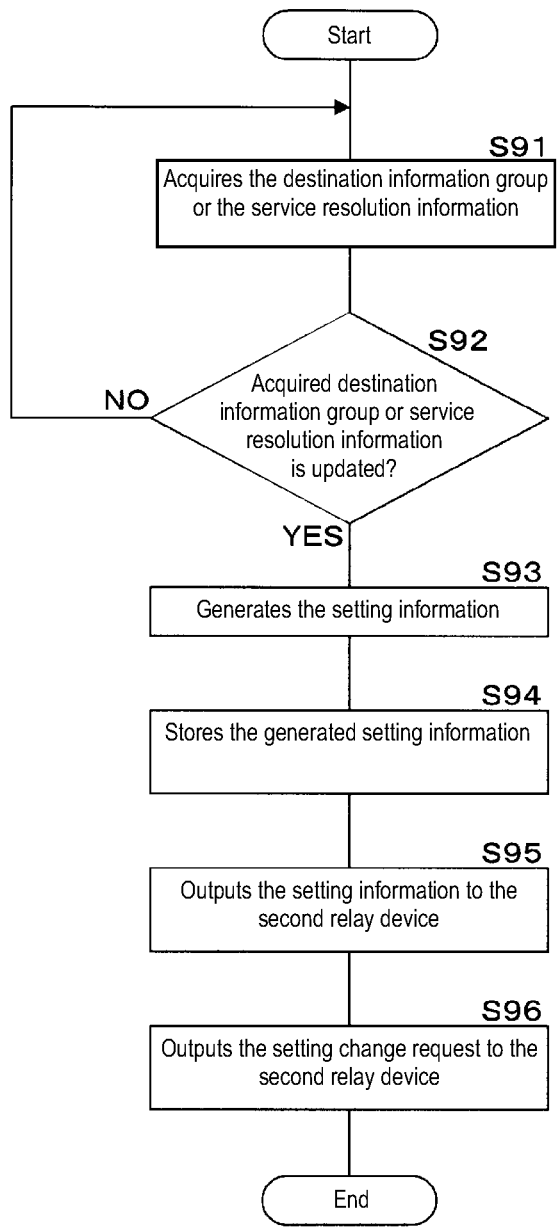
FIG. 8 is a flowchart illustrating processing according to the setting of the in-vehicle network, which is performed by a control unit of a first relay device.

FIG. 8 is a flowchart illustrating the processing according to the setting of the in-vehicle network 4 performed by the control unit 200 of the first relay device 21. For example, when the IG switch of the vehicle C is transitioned to the start state from the stop state, the control unit 200 of the first relay device 21 performs the following processing.

The control unit 200 of the first relay device 21 acquires (receives) the destination information group or the service resolution information output from the second relay device 22 (S91). Specifically, the control unit 200 of the first relay device 21 acquires at least one of the destination information group and the service resolution information output from the second relay device 22. Accordingly, the control unit 200 of the first relay device 21 may acquire both of the destination information group and the service resolution information. In addition to the destination information group and the service resolution information, the control unit 200 of the first relay device 21 may acquire the communication data relevant to the setting of the in-vehicle network 4 other than the information described above.

The control unit 200 of the first relay device 21 determines whether the acquired destination information group or service resolution information is updated (S92). For example, the control unit 200 of the first relay device 21 acquires the destination information group and the service resolution information periodically output from the second relay device 22. The control unit 200 of the first relay device 21 compares the most lately acquired destination information group and service resolution information with a destination information group and service resolution information acquired immediately before the destination information group and the service resolution information described above, respectively. When the most lately acquired destination information group or service resolution information is changed from the destination information group or the service resolution information acquired immediately before the most lately acquired information, the control unit 200 of the first relay device 21 determines that the destination information group or the service resolution information is updated.

In a case where the destination information group or the service resolution information is not updated (S92: NO), the control unit 200 of the first relay device 21 performs the processing of S91. In a case where the destination information group or the service resolution information is updated (S92: YES), the control unit 200 of the first relay device 21 generates the setting information, on the basis of the acquired destination information group and service resolution information (S93). Note that, when the first relay device 21 is started, the control unit 200 of the first relay device 21 may skip the processing of S92, and may perform the processing of S93. In other words, when the first relay device 21 is started, the control unit 200 of the first relay device 21 may perform the processing of S93, regardless of whether the destination information group or the service resolution information is updated.

For example, in the generation of the setting information, the control unit 200 of the first relay device 21 selects one setting information piece among the plurality of setting information pieces stored in advance in the storage unit 201 of the first relay device 21, on the basis of the destination information group. In the generation of the setting information, the control unit 200 of the first relay device 21 may transmit the destination information group to the external server, which is not illustrated and connected to the first relay device 21 such that communication is available, and may acquire the setting information based on the transmitted destination information group from the external server.

The control unit 200 of the first relay device 21 stores the generated setting information as the latest setting information in the storage unit 201 of the first relay device 21 (S94). In other words, the control unit 200 of the first relay device 21 retains the latest setting information. The latest setting information is the setting information to be applied to the in-vehicle network 4.

The control unit 200 of the first relay device 21 outputs the setting information stored as the latest setting information in the storage unit 201 of the first relay device 21 to the second relay device 22 (S95). In addition, the control unit 200 of the first relay device 21 outputs the setting change request to the second relay device 22 (S96). For example, the control unit 200 of the first relay device 21 may output the setting information to which the setting change request is assigned to the second relay device 22. The control unit 200 of the first relay device 21 ends the processing. The control unit 200 of the first relay device 21 may perform again the processing of S91, instead of ending the processing. The control unit 200 of the first relay device 21 may perform the standby processing for a predetermined time, and then, may perform again the processing of S91.

In this embodiment, the second relay device 22 relays the communication between the plurality of in-vehicle devices 3, or the communication between the in-vehicle device 3 and the first relay device 21. The first relay device 21 relays the communication between the plurality of in-vehicle devices 3. In addition, the first relay device 21 performs the authentication of the in-vehicle device 3. Before the authentication of the in-vehicle device 3 is completed, the control unit 200 of the second relay device 22 performs the relay of the authentication communication data and the transmission and reception of the communication data relevant to the setting of the in-vehicle network 4 in parallel. The control unit 200 of the first relay device 21 acquires the communication data relevant to the setting of the in-vehicle network 4 transmitted from the second relay device 22, and generates the setting information based on the acquired communication data relevant to the setting of the in-vehicle network 4. The control unit 200 of the first relay device 21 transmits the generated setting information to the second relay device 22. The control unit 200 of the second relay device 22 acquires the setting information transmitted from the first relay device 21. After the authentication with respect to the in-vehicle device 3 is completed, the control unit 200 of the second relay device 22 starts the relay based on the acquired setting information. In other words, the control unit 200 of the second relay device 22 applies the acquired setting information to the second relay device 22. The communication through the in-vehicle network 4 based on the setting information is started. Before the authentication of the in-vehicle device 3 is completed, the control unit 200 of the second relay device 22 performs the relay of the authentication communication data, and the transmission and reception of the communication data relevant to the setting of the in-vehicle network 4 in parallel, and thus, it is possible to acquire the setting information earlier than a case where the communication data relevant to the setting of the in-vehicle network 4 is transmitted to the first relay device 21 after the authentication is completed. Accordingly, when the authentication of the in-vehicle device 3 is required, the second relay device 22 is capable of starting the communication through the in-vehicle network 4 earlier than a case where the communication data relevant to the setting of the in-vehicle network 4 is transmitted to the first relay device 21 after the authentication is completed.

As with the second relay device 22, the control unit 200 of the first relay device 21 relays the communication through the in-vehicle network 4 based on the generated setting information. The first relay device 21 is capable of generating the setting information earlier than a case where the second relay device 22 transmits the communication data relevant to the setting of the in-vehicle network 4 to the first relay device 21 after the authentication is completed. Accordingly, in the in-vehicle system S, the first relay device 21 is capable of starting the communication through the in-vehicle network 4 earlier than a case where the communication data relevant to the setting of the in-vehicle network 4 is transmitted to the first relay device 21 after the authentication is completed.

The control unit 200 of the second relay device 22 acquires at least one of the destination information and the service resolution information of the in-vehicle device 3 from the in-vehicle device 3 connected to the second relay device 22 before the authentication of the in-vehicle device 3 is completed. The control unit 200 of the second relay device 22 outputs at least one of the acquired destination information and service resolution information, and the destination information of the second relay device 22 to the first relay device 21 before the authentication of the in-vehicle device 3 is completed. For example, the control unit 200 of the second relay device 22 outputs the destination information group including the acquired destination information and the destination information of the second relay device 22, and the acquired service resolution information to the first relay device 21 before the authentication of the in-vehicle device 3 is completed. For example, in a case where the plurality of in-vehicle devices 3 are connected to the second relay device, the destination information group includes the destination information of the second relay device and the destination information of each of the plurality of in-vehicle devices 3 connected to the second relay device. It is possible to decrease a communication frequency between the first relay device 21 and the second relay device 22, compared to a case where the control unit 200 of the second relay device 22 individually outputs the destination information of the second relay device 22, and at least one of the destination information and the service resolution information of the in-vehicle device 3 connected to the second relay device 22 to the first relay device 21.

The existing in-vehicle device 3 is mounted on the vehicle C. The existing in-vehicle device 3 is connected to the second relay device 22. When the additional in-vehicle device 3 is mounted on the vehicle C, the additional in-vehicle device 3 is connected to the second relay device 22. For example, when the additional in-vehicle device 3 is connected to the second relay device 22, the control unit 200 of the second relay device 22 communicates with the first relay device 21, and allows the first relay device 21 to perform the authentication of the additional in-vehicle device 3. Before the authentication is completed, the control unit 200 of the second relay device 22 outputs the communication data relevant to the setting of the in-vehicle network 4 of the connected additional in-vehicle device 3 and existing in-vehicle device 3, and the communication data relevant to the setting of the in-vehicle network 4 of the second relay device 22 to the first relay device 21. The control unit 200 of the second relay device 22 acquires the setting information of the in-vehicle network 4 including the additional in-vehicle device 3 as a node from the first relay device 21. When the additional in-vehicle device 3 is mounted on the vehicle C, it is possible to configure the in-vehicle network 4 including the additional in-vehicle device 3 as a node. When the additional in-vehicle device 3 is connected to the second relay device 22, the second relay device 22 is capable of starting the communication through the in-vehicle network 4 including the additional in-vehicle device 3 as a node earlier than a case where the communication data relevant to the setting of the in-vehicle network 4 is output to the first relay device 21 after the authentication is completed.

For example, in a case where a predetermined time has elapsed from a time point when the first relay device 21 starts the authentication of the in-vehicle device 3, and the authentication of the in-vehicle device 3 is not completed, the control unit 200 of the second relay device 22 may request again the first relay device 21 for the authentication of the in-vehicle device 3. In the case described above, the control unit 200 of the second relay device 22 may set the filter in the connection port connected to the in-vehicle device 3 of which the authentication is not completed in a case where the predetermined time has elapsed such that the communication with the in-vehicle device 3 is not performed, and may set the filter based on the setting information in the connection port other than the connection port to which the in-vehicle device 3 is connected. For example, the predetermined time is stored in advance in the storage unit 201 of the second relay device 22.

Since the second relay device 22 is provided between the first relay device 21 and the in-vehicle device 3, in the vehicle C, it is possible to configure the in-vehicle network 4 forming a star-shaped network topology with the first relay device 21 at the center. In addition, it is possible to configure the in-vehicle network 4 forming a cascade-shaped network topology with the first relay device 21 at the top.

In this embodiment, the additional in-vehicle device 3 is connected to the second relay device 22 when the IG switch is in the stop state, but the additional in-vehicle device 3 is connected to the second relay device 22 when the IG switch is in the start state.

In this embodiment, the authentication is performed with respect to the additional in-vehicle device 3, but the authentication may be performed with respect to the existing in-vehicle device 3. In this embodiment, the first relay device 21 performs the authentication of the in-vehicle device 3, but the in-vehicle system S may have a configuration in which the first relay device 21 and the second relay device 22 perform the authentication of the in-vehicle device 3 in cooperation.

The in-vehicle ECU 2 that does not function as the first relay device 21 or the second relay device 22 may perform the authentication of the in-vehicle device 3, instead of the first relay device 21. That is, the in-vehicle device 3 that performs the authentication of the in-vehicle device 3 but does not perform the relay of the communication may be included in the in-vehicle system S. For example, in a case where the in-vehicle ECU 2 functioning as the second relay device 22, and the in-vehicle ECU 2 performing the authentication are mounted on the vehicle C, the second relay device 22 is connected to the in-vehicle ECU 2 performing the authentication of the in-vehicle device 3 such that communication is available. The second relay devices 22 are connected such that communication is available. The second relay device 22 relays the communication between the in-vehicle device 3 connected to the second relay device 22 and the in-vehicle device 3 connected to another second relay device 22 through the connected another second relay device 22. In this case, the in-vehicle ECU 2 performing the authentication corresponds to the authentication device.

The second relay device 22 may function as the first relay device 21. In other words, the second relay device 22 may perform the authentication of the in-vehicle device 3. The first relay device 21 may function as the second relay device 22. In this case, for example, the plurality of in-vehicle devices 3 are directly connected to the first relay device 21 without using the second relay device 22. The first relay device 21 relays the communication between the plurality of in-vehicle devices 3 directly connected to the first relay device 21. In addition, the first relay device 21 relays the communication between the in-vehicle device 3 directly connected to the first relay device 21 and the in-vehicle device 3 connected to the second relay device 22 through the second relay device 22.

The in-vehicle ECU 2 other than the in-vehicle ECU 2 functioning as the first relay device 21 and the in-vehicle ECU 2 functioning as the second relay device 22 may be connected to the first relay device 21 or the second relay device 22. In this case, the in-vehicle ECU 2 other than the in-vehicle ECU 2 functioning as the first relay device 21 and the in-vehicle ECU 2 functioning as the second relay device 22 is included in the in-vehicle device 3.

In this embodiment, the in-vehicle system S includes the plurality of in-vehicle ECUs 2 including the in-vehicle ECU 2 functioning as the first relay device 21 and the in-vehicle ECU 2 functioning as the second relay device 22, and the in-vehicle device 3, but the configuration of the in-vehicle system S is not limited to the example described above. The in-vehicle system S may include a relay device that connects the in-vehicle ECUs 2 or the in-vehicle ECU 2 and the in-vehicle device 3, and relays the communication between the in-vehicle ECUs 2 or between the in-vehicle ECU 2 and the in-vehicle device 3, in addition to the plurality of in-vehicle ECUs 2 and the in-vehicle device 3. In this case, the relay device includes the first relay device 21 and the second relay device 22. The in-vehicle network 4 including the in-vehicle ECU 2, the in-vehicle device 3, and the relay device as a node is configured. In the case described above, the in-vehicle ECU 2 is included in the in-vehicle device 3 connected to the relay device.

The embodiment disclosed herein is illustrative in all respects and should not be considered restrictive. The scope of the present disclosure is indicated by the claims but not the meaning described above, and is intended to include all changes within the meaning and the scope equivalent to the claims.

The invention claimed is:

1. An in-vehicle relay device to be connected to a plurality of in-vehicle devices mounted on a vehicle and an authentication device performing authentication of the in-vehicle device, to relay communication between the plurality of in-vehicle devices, the in-vehicle relay device comprising
a control unit controlling the relay of the communication, wherein the control unit
relays authentication communication data for the authentication between the in-vehicle device and the authentication device before the authentication of the in-vehicle device connected to the in-vehicle relay device is completed,
transmits and receives setting data for setting an in-vehicle network with the in-vehicle device and the authentication device, in parallel with the relay of the authentication communication data,
acquires setting information of the in-vehicle network according to the transmitted setting data, from the authentication device, and
starts relay based on the acquired setting information after the authentication is completed.

2. The in-vehicle relay device according to claim 1, wherein the setting data includes at least one of destination information for performing communication and service resolution information for the in-vehicle device to start provision of a function, and
the control unit outputs at least one of the acquired destination information of the in-vehicle device and service resolution information, and destination information of the in-vehicle relay device to the authentication device before the authentication is completed.

3. The in-vehicle relay device according to claim 1, wherein the in-vehicle device includes an existing in-vehicle device mounted in advance on the vehicle, and an additional in-vehicle device mounted on the vehicle at a time point after a time point when the existing in-vehicle device is mounted on the vehicle, and the authentication is performed with respect to the additional in-vehicle device.

4. The in-vehicle relay device according to claim 1, wherein the in-vehicle relay device is provided between the authentication device and the in-vehicle device.

5. An in-vehicle system, comprising:
the authentication device; and
the in-vehicle relay device according to claim 1,
wherein the in-vehicle relay device outputs the setting data to the authentication device before the authentication of the in-vehicle device is completed, and
the authentication device
receives the setting data output from the in-vehicle relay device, and
outputs the setting information according to the received setting data to the in-vehicle relay device.

6. An information processing method performed by an in-vehicle relay device connected to a plurality of in-vehicle devices mounted on a vehicle and an authentication device performing authentication of the in-vehicle device, to relay communication between the plurality of in-vehicle devices, the method comprising:
relaying authentication communication data for the authentication between the in-vehicle device and the authentication device before the authentication of the in-vehicle device connected to the in-vehicle relay device is completed;
transmitting and receiving setting data for setting an in-vehicle network with the in-vehicle device and the authentication device, in parallel with the relay of the authentication communication data;
acquiring setting information of the in-vehicle network according to the transmitted setting data, from the authentication device; and
starting relay based on the acquired setting information after the authentication is completed.

7. A computer program product for allowing a computer, connected to a plurality of in-vehicle devices mounted on a vehicle and an authentication device performing authentication of the in-vehicle device, to relay communication between the plurality of in-vehicle devices, the computer program product comprising a non-transitory, machine-readable medium storing instructions which, when executed by at least one programmable processor, caused at least one programmable processor to execute processing of:
relaying authentication communication data for the authentication between the in-vehicle device and the authentication device before the authentication of the in-vehicle device connected to the computer is completed;
transmitting and receiving setting data for setting an in-vehicle network with the in-vehicle device and the authentication device, in parallel with the relay of the authentication communication data;
acquiring setting information of the in-vehicle network according to the transmitted setting data, from the authentication device; and
starting relay based on the acquired setting information after the authentication is completed.

8. The in-vehicle relay device according to claim 2, wherein the in-vehicle relay device is provided between the authentication device and the in-vehicle device.

9. The in-vehicle relay device according to claim 3, wherein the in-vehicle relay device is provided between the authentication device and the in-vehicle device.

10. An in-vehicle system, comprising:
the authentication device; and
the in-vehicle relay device according to claim 2,
wherein the in-vehicle relay device outputs the setting data to the authentication device before the authentication of the in-vehicle device is completed, and
the authentication device
receives the setting data output from the in-vehicle relay device, and
outputs the setting information according to the received setting data to the in-vehicle relay device.

11. An in-vehicle system, comprising:
the authentication device; and
the in-vehicle relay device according to claim 3,
wherein the in-vehicle relay device outputs the setting data to the authentication device before the authentication of the in-vehicle device is completed, and
the authentication device
receives the setting data output from the in-vehicle relay device, and
outputs the setting information according to the received setting data to the in-vehicle relay device.

12. An in-vehicle system, comprising:
the authentication device; and
the in-vehicle relay device according to claim 4,
wherein the in-vehicle relay device outputs the setting data to the authentication device before the authentication of the in-vehicle device is completed, and
the authentication device
receives the setting data output from the in-vehicle relay device, and
outputs the setting information according to the received setting data to the in-vehicle relay device.

13. The in-vehicle relay device according to claim 2, wherein the in-vehicle device includes an existing in-vehicle device mounted in advance on the vehicle, and an additional in-vehicle device mounted on the vehicle at a time point after a time point when the existing in-vehicle device is mounted on the vehicle, and
the authentication is performed with respect to the additional in-vehicle device.

\* \* \* \* \*